(12) United States Patent
Masuno et al.

(10) Patent No.: US 9,979,896 B2
(45) Date of Patent: May 22, 2018

(54) IMAGE PROCESSING APPARATUS, IMAGE PROCESSING METHOD, ELECTRONIC EQUIPMENT AND PROGRAM

(71) Applicant: Sony Corporation, Tokyo (JP)

(72) Inventors: Tomonori Masuno, Tokyo (JP); Kensei Jo, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days. days.

(21) Appl. No.: 15/039,807

(22) PCT Filed: Nov. 21, 2014

(86) PCT No.: PCT/JP2014/080866
§ 371 (c)(1),
(2) Date: May 26, 2016

(87) PCT Pub. No.: WO2015/083562
PCT Pub. Date: Jun. 11, 2015

(65) Prior Publication Data
US 2017/0013183 A1    Jan. 12, 2017

(30) Foreign Application Priority Data

Dec. 4, 2013  (JP) .................................. 2013-251164

(51) Int. Cl.
*H04N 5/235* (2006.01)
*H04N 5/357* (2011.01)
(Continued)

(52) U.S. Cl.
CPC ......... *H04N 5/2357* (2013.01); *H04N 5/2356* (2013.01); *H04N 5/357* (2013.01);
(Continued)

(58) Field of Classification Search
None
See application file for complete search history.

(56) References Cited

U.S. PATENT DOCUMENTS

2011/0317028 A1* 12/2011 Shinmei ............... H04N 5/2355
                                                  348/223.1
2012/0002074 A1*  1/2012 Baba ..................... H04N 5/235
                                                  348/228.1
(Continued)

FOREIGN PATENT DOCUMENTS

JP    11-075109 A    3/1999
JP    2001-061105 A  3/2001
(Continued)

*Primary Examiner* — Timothy J Henn
(74) *Attorney, Agent, or Firm* — Wolf, Greenfield & Sacks, P.C.

(57) ABSTRACT

The present technology relates to an image processing apparatus, an image processing method, electronic equipment and a program which can remove cyclic noise from an image including the cyclic noise.

An estimating unit configured to estimate cyclic noise components included in each image picked up under different exposure conditions for each image is included. The estimating unit estimates the cyclic noise components for each image through operation utilizing mutual relationship between the noise components under the exposure conditions. For example, the cyclic noise is flicker. The mutual relationship between the noise components may be expressed with a shutter function of the exposure conditions in frequency space. The present technology may be applied to an imaging apparatus.

19 Claims, 25 Drawing Sheets

(51) Int. Cl.
*H04N 5/374* (2011.01)
*H04N 9/04* (2006.01)

(52) U.S. Cl.
CPC ........... *H04N 5/374* (2013.01); *H04N 5/2353* (2013.01); *H04N 5/2355* (2013.01); *H04N 9/045* (2013.01); *H04N 2209/045* (2013.01)

(56) References Cited

U.S. PATENT DOCUMENTS

| | | | | |
|---|---|---|---|---|
| 2013/0271623 A1* | 10/2013 | Jo | ........................ | H04N 5/2357 348/226.1 |
| 2014/0153839 A1* | 6/2014 | Tsuzuki | ............... | H04N 5/2355 382/254 |
| 2014/0267815 A1* | 9/2014 | Koizumi | .............. | H04N 5/2355 348/218.1 |
| 2014/0307117 A1* | 10/2014 | Feng | .................... | H04N 5/2351 348/218.1 |
| 2015/0103209 A1* | 4/2015 | Elhachimi | .............. | H04N 5/265 348/239 |

FOREIGN PATENT DOCUMENTS

| | | |
|---|---|---|
| JP | 2011-160090 A | 8/2011 |
| JP | 2013-219708 A | 10/2013 |

\* cited by examiner

|  | 240(1,2) | 240(1,3) | 240(1,4) | 240(1,5) | 240(1,6) | 240(1,7) | 240(1,8) |
|---|---|---|---|---|---|---|---|
| 240(1,1) | R | R | G | G | R | R | G | G |
| 240(2,1) | R | R | G | G | R | R | G | G |
| 240(3,1) | G | G | B | B | G | G | B | B |
| 240(4,1) | G | G | B | B | G | G | B | B |
| 240(5,1) | R | R | G | G | R | R | G | G |
| 240(6,1) | R | R | G | G | R | R | G | G |
| 240(7,1) | G | G | B | B | G | G | B | B |
| 240(8,1) | G | G | B | B | G | G | B | B |

IMAGE PROCESSING APPARATUS, IMAGE PROCESSING METHOD, ELECTRONIC EQUIPMENT AND PROGRAM

CROSS REFERENCE TO RELATED APPLICATIONS

This application claims the benefit under 35 U.S.C. § 371 as a U.S. National Stage Entry of International Application No. PCT/JP2014/080866, filed in the Japanese Patent Office as a Receiving Office on Nov. 21, 2014, which claims priority to Japanese Patent Application Number JP2013-251164, filed in the Japanese Patent Office on Dec. 4, 2013, each of which is hereby incorporated by reference in its entirety.

TECHNICAL FIELD

The present technology relates to an information processing apparatus, an information processing method, electronic equipment and a program. Specifically, the present technology relates to an image processing apparatus, an image processing method, electronic equipment and a program for correcting flicker occurring in an image.

BACKGROUND ART

When an image is picked up using a camera equipped with an XY-address scan type imaging device such as a complementary metal oxides semiconductor (CMOS) imaging device under illumination of a fluorescent light, stripe brightness unevenness or color unevenness occurs in a video signal. This phenomenon is referred to as flicker. This flicker is caused due to a fluorescent light connected to a commercial power supply (AC) repeating blinking basically with a cycle double a cycle of a power-supply frequency and due to operating principle of the imaging device.

A stripe brightness change pattern extending in a horizontal direction appears in an image in which flicker occurs. For example, when a moving image is observed, a stripe pattern appearing vertically is observed. Examples of related art which discloses a technique for suppressing such flicker include, for example, Patent Literature 1. Patent Literature 1 discloses a method for removing a flicker component included in an image by extracting the flicker component from the image, calculating a flicker correction coefficient which has a reversed-phase pattern of the flicker component and performing correction by multiplying a pixel value of the image by the flicker correction coefficient.

CITATION LIST

Patent Literature

Patent Literature 1: JP 2011-160090A

SUMMARY OF INVENTION

Technical Problem

By the way, for example, in order to generate a high dynamic range image, an imaging apparatus has been proposed which generates a high dynamic range image for which a more accurate pixel value is set from a low brightness portion to a high brightness portion by picking up a plurality of images for which different exposure periods are set.

When the above-described processing disclosed in Patent Literature 1 is tried to be applied to the imaging apparatus which picks up the plurality of images in different exposure periods as described above, it is necessary to execute processing such as processing of extracting a flicker component, processing of calculating a reversed-phase correction coefficient of the flicker component and correction processing based on the correction coefficient individually for each of the plurality of images picked up in different exposure periods.

In this manner, in order to execute the above-described processing on each of the images with different exposure periods, there is a possibility that hardware components may increase and a processing period may increase.

The present technology has been made in view of such circumstances, and is directed to making it possible to efficiently execute processing of reducing cyclic noise such as flicker with a simple configuration.

Solution to Problem

According to an aspect of the present technology, an image processing apparatus includes: an estimating unit configured to estimate cyclic noise components included in each image picked up under different exposure conditions for each image. The estimating unit estimates the cyclic noise components for each image through operation utilizing mutual relationship between the noise components under the exposure conditions.

The cyclic noise may be flicker.

The mutual relationship between the noise components may be expressed with a shutter function of the exposure conditions in frequency space.

The estimating unit may estimate the noise components using a value obtained by integrating the images, multiplying a predetermined window function and performing Fourier series expansion.

The integration may be performed in a horizontal direction for a portion not saturated in any of the images.

The estimating unit may obtain the noise components in frequency space by obtaining a matrix Q where QF=0 when a fluctuation component of a light source is F and obtaining the fluctuation component F. The estimating unit may estimate the noise components for each image by performing Fourier series inverse transform on the noise components in the frequency space.

The mutual relationship between the noise components may be expressed with a ratio obtained by integrating the images and performing division for each row of the images.

The integration may be performed in a horizontal direction for a portion not saturated in any of the images.

The estimating unit may obtain an eigenvector of an eigenvalue 1 of a matrix RT where R is a matrix obtained by performing Fourier series expansion on the ratio and T is a matrix obtained from the exposure conditions, and set the eigenvector as a value obtained by performing Fourier series expansion on the noise components of the images.

The noise components of the images may be calculated by performing Fourier series inverse transform on the eigenvector.

A value obtained by performing Fourier series expansion on the noise components of an image different from an image for which the noise components have been calculated may be calculated by multiplying the eigenvector by a coefficient obtained from the exposure conditions. The noise components of the images may be calculated by performing Fourier series inverse transform on the value obtained by performing Fourier series expansion.

The estimating unit may generate a matrix RT in the following formula, $$\begin{bmatrix} R_0 & \overline{R}_1 & \cdots & \overline{R}_M & & & 0 \\ R_1 & R_0 & \ddots & \ddots & \ddots & & \\ \vdots & \ddots & R_0 & \overline{R}_1 & \ddots & \ddots & \\ R_M & \ddots & \ddots & R_0 & \ddots & \ddots & \overline{R}_M \\ & \ddots & \ddots & R_1 & R_0 & \ddots & \vdots \\ & & \ddots & \ddots & \ddots & R_0 & \overline{R}_1 \\ 0 & & & R_M & \cdots & R_1 & R_0 \end{bmatrix}$$ [Math. 1]

$$\begin{bmatrix} \overline{T}_M & & & & & 0 \\ & \ddots & & & & \\ & & \overline{T}_1 & & & \\ & & & T_0 & & \\ & & & & T_1 & \\ & & & & & \ddots \\ 0 & & & & & T_M \end{bmatrix} \begin{bmatrix} \overline{G_1(M)} \\ \vdots \\ \overline{G_1(1)} \\ G_1(0) \\ G_1(1) \\ \vdots \\ G_1(M) \end{bmatrix} = \begin{bmatrix} \overline{G_1(M)} \\ \vdots \\ \overline{G_1(1)} \\ G_1(0) \\ G_1(1) \\ \vdots \\ G_1(M) \end{bmatrix}$$

where R is the ratio, T is the coefficient obtained from the exposure conditions and G is the noise components of the images, and obtain the noise components of the images.

The estimating unit may obtain an eigenvector of an eigenvalue 1 of a matrix rt where a matrix r is the ratio and a matrix t is a matrix obtained from the exposure conditions, and estimate that the eigenvector is the noise components of the images.

The noise components of an image different from an image for which the noise components have been calculated may be calculated from a linear sum of the estimated noise components.

The estimating unit may obtain the noise components for each image by obtaining $g_1$, $g_2$ which satisfy the following formula through least-squares estimation, $$\begin{bmatrix} t & -I \\ I & -r \end{bmatrix} \begin{bmatrix} g_1 \\ g_2 \end{bmatrix} = 0$$ [Math. 2]

where r is the ratio, t is the value obtained from the exposure conditions, I is a pixel value of the images and g is the noise components.

According to an aspect of the present technology, an image processing method includes: an estimating step of estimating cyclic noise components included in each image picked up under different exposure conditions for each image. The estimating step includes processing of estimating the cyclic noise components for each image through operation utilizing mutual relationship between the noise components under the exposure conditions.

According to an aspect of the present technology, a program causing a computer to execute processing includes: an estimating step of estimating cyclic noise components included in each image picked up under different exposure conditions for each image. The estimating step includes processing of estimating the cyclic noise components for each image through operation utilizing mutual relationship between the noise components under the exposure conditions.

According to an aspect of the present technology, electronic equipment includes: a signal processing unit configured to perform signal processing on a pixel signal outputted from an imaging device. The signal processing unit includes an estimating unit configured to estimate cyclic noise components included in each image picked up under different exposure conditions for each image, and a correcting unit configured to perform correction to remove noise from the images using the noise components estimated at the estimating unit. The estimating unit estimates the cyclic noise components for each image through operation utilizing mutual relationship between the noise components under the exposure conditions.

In the image processing apparatus, the image processing method and the program according to one aspect of the present technology, cyclic noise components respectively included in images picked up under different exposure conditions are estimated for each image. The estimation is performed by estimating a cyclic noise component for each image through operation utilizing mutual relationship between noise components under exposure conditions.

In the electronic equipment according to one aspect of the present technology, signal processing is performed on a pixel signal outputted from the imaging device, and as one processing of the signal processing, cyclic noise components respectively included in images picked up under different exposure conditions are estimated for each image, and correction is performed to remove noise from the images using the estimated noise components. The estimation is performed by estimating a cyclic noise component for each image through operation utilizing mutual relationship between noise components under exposure conditions.

Advantageous Effects of Invention

According to one aspect of the present technology, it is possible to efficiently execute processing of reducing cyclic noise such as flicker with a simple configuration.

It should be noted that the advantageous effects of the present invention are not limited to the advantageous effects described herein, and may include any advantageous effect described in the present disclosure.

BRIEF DESCRIPTION OF DRAWINGS

FIG. 5 is a diagram illustrating an arrangement example of pixels with different exposure periods.

FIG. 7 is a diagram illustrating an arrangement example of pixels with different exposure periods.

FIG. 9 is a diagram illustrating an arrangement example of pixels with different exposure periods.

FIG. 10 is a diagram illustrating an arrangement example of pixels with different exposure periods.

FIG. 12 is a diagram illustrating an arrangement example of pixels with different exposure periods.

DESCRIPTION OF EMBODIMENTS

Embodiments for implementing the present technology (hereinafter, referred to as embodiments) will be described below. It should be noted that description will be provided in the following order.
1. Flicker Occurrence Principle and Correction Principle
2. Configuration of Imaging Apparatus
3. Configuration of Image Processing Unit
4. Configuration of Flicker Correcting Unit
5. Calculation of Flicker Ratio
6. First Embodiment of Flicker Suppression
7. Second Embodiment of Flicker Suppression
8. Third Embodiment of Flicker Suppression
9. Recording Medium <Flicker Occurrence Principle and Correction Principle>

Figure 1:
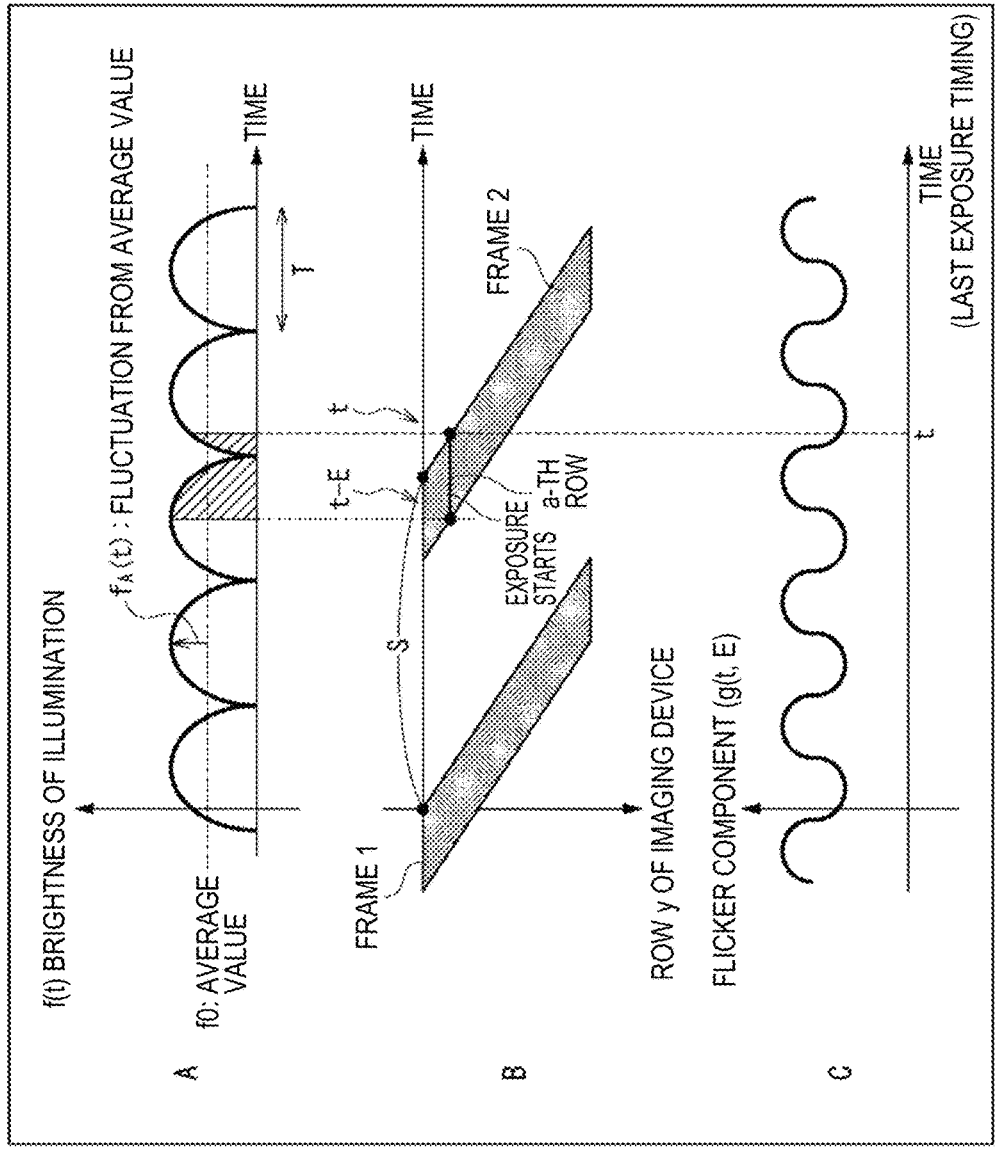
FIG. 1 is a diagram for explaining occurrence principle and correction of flicker.

First, flicker occurrence principle and correction principle will be described with reference to FIG. 1. Part A in FIG. 1 illustrates temporal change of illumination brightness under an environment where an image is picked up using a camera. Typically, because a commercial power supply is an AC power supply of 50 Hz or 60 Hz, illumination light such as light from a fluorescent light is likely to fluctuate at a frequency of 100 Hz or 120 Hz.

It should be noted that while description is provided here using flicker as an example, the present technology described below can be also applied to noise, or the like, occurring at a predetermined frequency like flicker.

Graph A in FIG. 1 indicates time t on a horizontal axis and illumination brightness f(t) at each time t on a vertical axis. The illumination light brightness f(t) at time t can be expressed as follows when the illumination light brightness f(t) is decomposed into an average value $f_D$ of illumination light brightness and fluctuation $f_A(t)$ from the average value of the illumination light brightness.

$$f(t)=f_D+f_A(t) \qquad (1)$$

The average value $f_D$ of the illumination light brightness is a constant value regardless of time t, and fluctuation $f_A(t)$ from the average value becomes a value periodically fluctuating according to a frequency of illumination. Further, when the brightness of the illumination light is a cycle of f(t) is set to T, the following relationship holds.

[Math. 3]

$$f(t+T)=f(t)$$

$$\int_t^{t+T} f(\tau)d\tau = f_D$$

$$\int_t^{t+T} f_A(\tau)d\tau = 0 \qquad (2)$$

Flicker correction processing is processing for removing influence of fluctuation $f_A(t)$ from the average value of the illumination light brightness, from an observation image, that is, an image picked up using a camera.

Part B in FIG. 1 illustrates a pattern diagram of an exposure timing of an imaging device in which an imaging timing is different for each row as in a CMOS image sensor. Part B indicates time t on a horizontal axis and row y of the imaging device on a vertical axis. The example illustrated in the diagram is an example in the case where images of continuous image frames are picked up at regular intervals S, and illustrates exposure timings when two images of a frame 1 and a frame 2 are picked up. When each frame image is picked up, exposure is sequentially executed from an upper row from a lower row of the imaging device.

Because an exposure timing when each frame image is picked up is different for each row of the imaging device, influence of accumulated illumination light is also different for each row. For example, exposure completion time of a predetermined pixel of the imaging device in an exposure period E is set at t. When a sum of illumination light while the pixel is exposed under conditions in which there is influence of flicker is set at $F_A(t, E)$, $F_A(t, E)$ can be expressed as follows.

[Math. 4]

$$F_A(t,E)=\int_{t-E}^t f(\tau)d\tau = f_D \cdot E + \int_{t-E}^t f_A(\tau)d\tau \qquad (3)$$

A sum of illumination light under ideal conditions in which there is no flicker is set at $F_D(t, E)$. Because $F_D(t, E)$ is not affected by flicker, fluctuation from the average value of the illumination light brightness becomes $f_A(t)=0$, and $F_D(t, E)$ can be expressed as follows.

$$F_D(t,E)=f_D \times E \qquad (4)$$

Here a "flicker component" is defined as a ratio between an ideal image in which there is no flicker and an image which is affected by flicker. The flicker component is equal to a ratio of a total amount of illumination light while pixels accumulate the illumination light. Therefore, a flicker component g(t, E) of a pixel at exposure completion time t in the imaging device in the exposure period E can be formulated as expressed in the following formula (5).

[Math. 5]

$$g_t(t, E) = \frac{F_A(t, E)}{F_D(t, E)} = \frac{Ef_D + \int_{t-E}^t f_A(\tau)d\tau}{Ef_D} \qquad (5)$$

Part C in FIG. 1 indicates an exposure completion timing t of each pixel of an image on a horizontal axis and a flicker component g(t, E) on a vertical axis, and schematically illustrates relationship between the exposure completion timing t and the flicker component g(t, E). It should be noted that, as described above, because the illumination light fluctuates, the flicker component also has periodicity. Therefore, if the flicker component g(t, E) can be obtained once, it is basically possible to estimate the flicker component g(t, E) corresponding to any exposure completion timing t.

It should be noted that the exposure completion timing as illustrated in part B in FIG. 1 changes in units of row of the imaging device. Accordingly, as illustrated in part C in FIG. 1, the flicker component g(t, E) becomes a value different according to the exposure completion timing T of each row.

Figure 2:
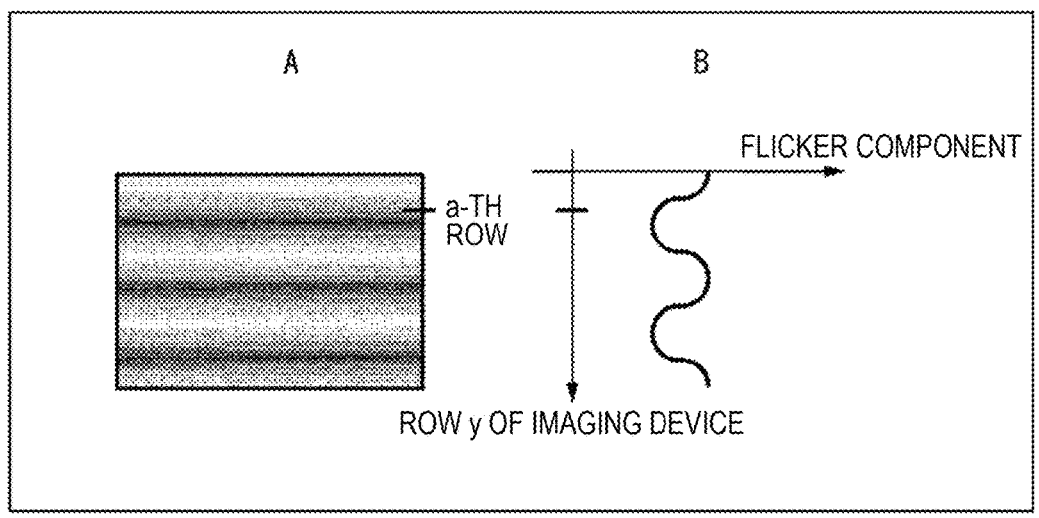
FIG. 2 is a diagram for explaining occurrence principle and correction of flicker.

Part A in FIG. 2 is a pattern diagram of influence of flicker occurring in an output image of the imaging device which is affected by flicker. Because the exposure completion timing is different for each row, a bright and dark stripe pattern in units of row appears in the output image.

Part B in FIG. 2 is a graph g(t0, y, E) of a flicker component in each row of the output image. t0 indicates time at which exposure in the first row is finished, and y indicates a target row. A data processing unit of the imaging apparatus (camera) can calculate a flicker component g(t, E) corresponding to t from graph C in FIG. 1 based on the exposure period E when an image is picked up and the exposure completion timing t of each row y.

Specifically, a unit of a period from exposure of a predetermined row being finished until exposure of the next row below is finished is defined as 1 [line]. When the unit is defined in this manner, g(t0, y, E) and g(t, E) can be converted as follows.

$$g_y(t,y,E) = gt(t+y,E) \qquad (6)$$

A data processing unit of the imaging apparatus (camera) can calculate a flicker component g(t, E) corresponding to t in graph C in FIG. 1 based on the exposure period E when an image is picked up and the exposure completion timing t of each row y. For example, when the exposure completion time in the a-th row illustrated in FIG. 2 is set at t, a flicker component g(t, E) corresponding to t can be calculated from graph C in FIG. 1. If the flicker component g(t,E) of a pixel at the exposure completion time t in the imaging device in the exposure period E can be known, it is possible to estimate a flicker component g(y) of each row of the imaging device.

Figure 3:
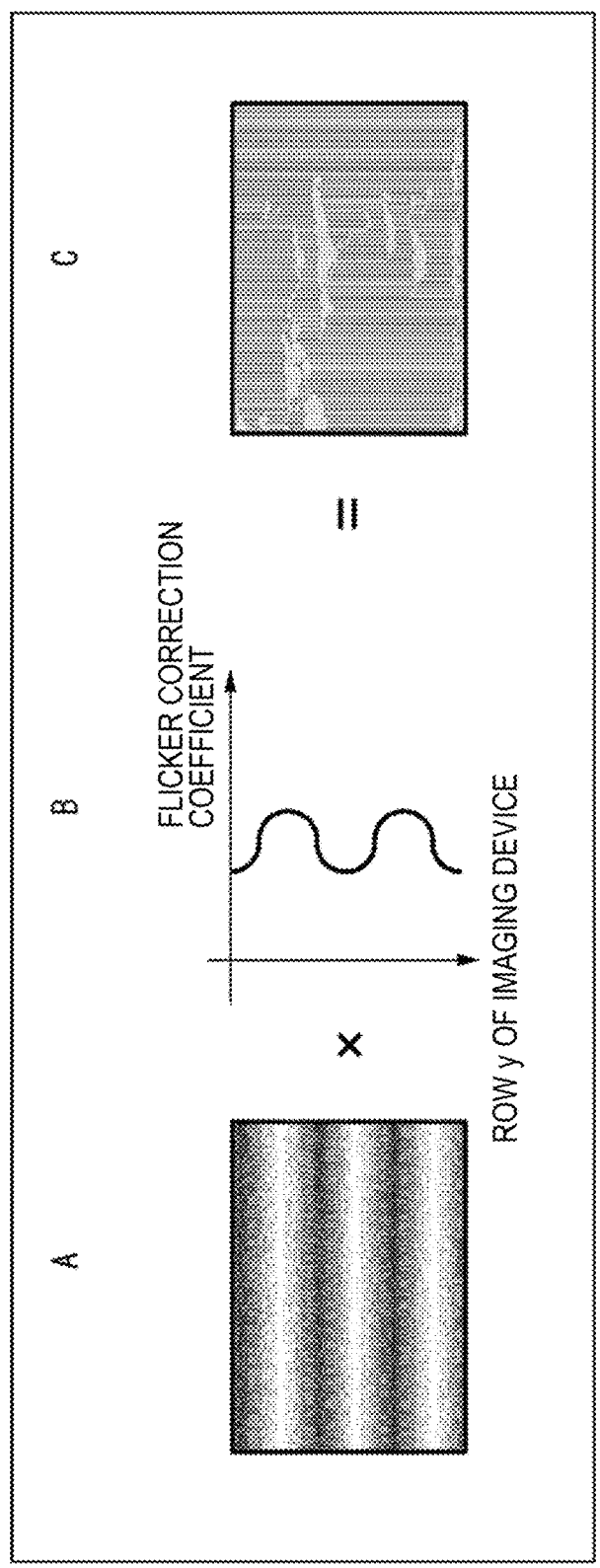
FIG. 3 is a diagram for explaining occurrence principle and correction of flicker.

FIG. 3 illustrates flicker correction principle. FIG. 3 includes the following diagrams.
Part A in FIG. 3: image including a flicker component (=part A in FIG. 2)
Part B in FIG. 3: flicker correction function (=reciprocal of part B in FIG. 2)
Part C in FIG. 3: flicker correction image (=part A in FIG. 3×part B in FIG. 3)

For example, it is possible to obtain an ideal image which is not affected by flicker illustrated in part C in FIG. 3 by measuring a flicker component g(y) of each row using the above-described method and multiplying each pixel value of the observation image illustrated in part A in FIG. 3, that is, an image picked up using the camera by the reciprocal of the flicker component g(y) illustrated in part B in FIG. 3.

<Configuration of Imaging Apparatus>

An image processing apparatus to which the present technology is applied receives input of a plurality of picked up images for which different exposure periods are set and generates and outputs corrected images from which flicker components are removed or reduced to generate, for example, a high dynamic range image. The image processing apparatus to which the present technology is applied, for example, synthesizes a plurality of picked up images for which different exposure periods are set to generate and output a high dynamic range image in which more accurate pixel values are set from a low brightness portion to a high brightness portion.

In the image processing apparatus to which the present technology is applied, processing of calculating a flicker component for each of a plurality of images for which different exposure periods are set is not executed. Processing of calculating a flicker component is executed on only a picked up image in one exposure period, and processing of estimating flicker components included in picked up images for which the other different exposure periods are set is executed by utilizing the flicker component calculated based on the picked up image of the one exposure period. Such image processing apparatus will be described.

Figure 4:
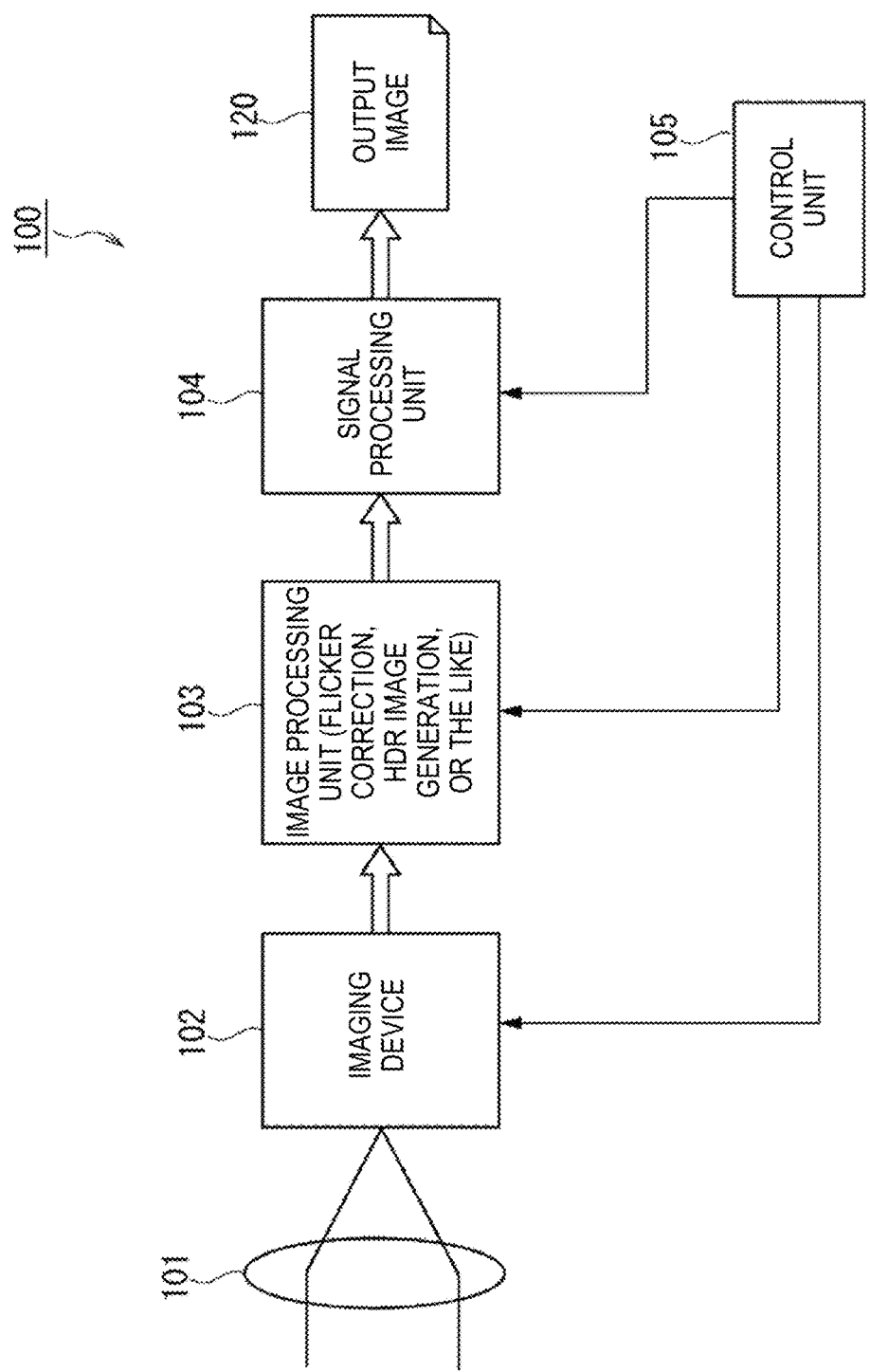
FIG. 4 is a diagram illustrating a configuration of an embodiment of an imaging apparatus to which the present technology is applied.

FIG. 4 is a diagram illustrating a configuration of an embodiment of the image processing apparatus to which the present technology is applied. Here, description will be provided using an example of an imaging apparatus including an image processing apparatus.

An imaging apparatus 100 illustrated in FIG. 4 is configured to include an optical lens 101, an imaging device 102, an image processing unit 103, a signal processing unit 104 and a control unit 105. In the imaging apparatus 100 illustrated in FIG. 4, light incident through the optical lens 101 is incident on an imaging unit, for example, the imaging device 102 configured with a CMOS image sensor, or the like, and image data obtained through photoelectric conversion is outputted. The output image data is inputted to the image processing unit 103.

The output image of the imaging device 102 is a so-called mosaic image in which any pixel value of R, G and B is set at each pixel. The image processing unit 103 performs the above-described flicker correction processing, and, further, processing of generating a high dynamic range (HDR) image based on processing of synthesizing a long-period exposure image and a short-period exposure image, or the like.

The output of the image processing unit 103 is inputted to the signal processing unit 104. The signal processing unit 104 executes signal processing which is performed in a typical camera, such as, for example, white balance (WB) adjustment and gamma correction, to generate an output image 120. The output image 120 is stored in a storage unit which is not illustrated or outputted to a display unit.

The control unit 105 outputs a control signal to each unit according to a program stored in, for example, a memory which is not illustrated, to control various kinds of processing.

It should be noted that while description will be continued here while the imaging device 102, the image processing unit 103, the signal processing unit 104 and the control unit 105 are respectively illustrated as separate blocks, all or part of these units may be integrally configured.

For example, it is also possible to integrally configure the imaging device 102, the image processing unit 103, the signal processing unit 104 and the control unit 105 as a laminate structure. Further, it is also possible to integrally configure the imaging device 102, the image processing unit 103 and the signal processing unit as a laminate structure. Still further, it is also possible to integrally configure the imaging device 102 and the image processing unit 103 as a laminate structure.

Further, the configuration of the imaging apparatus 100 is not limited to the configuration illustrated in FIG. 4 and may be other configurations. For example, it is also possible to divide the image processing unit 103 into a plurality of image processing units and configure a laminate structure by integrating part of the image processing units and the imaging device 102.

Next, an example of an exposure control configuration of the imaging device 102 will be described with reference to FIG. 5. In the imaging apparatus 100, a long-period exposure pixel and a short-period exposure pixel are set in units of pixels included in one picked up image, and a high dynamic range image is generated through synthesis processing (α-blend) between these pixels. This exposure period control is performed through control by the control unit 105.

Figure 5:
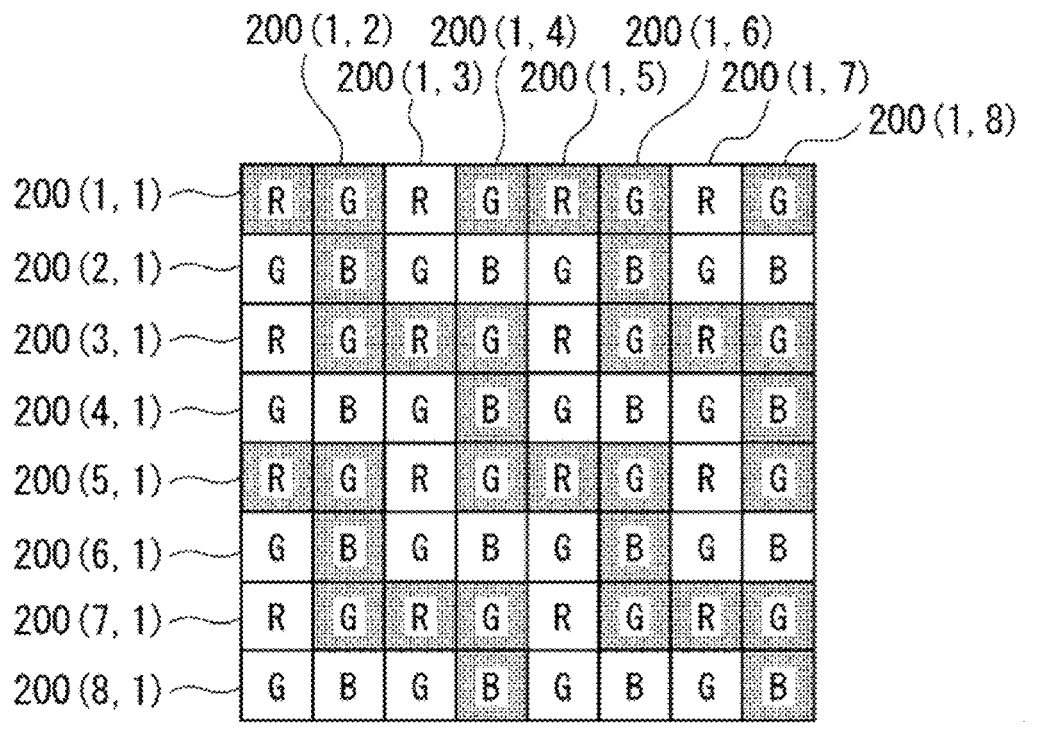

FIG. 5 is a diagram illustrating an example of exposure period setting of the imaging device 102. As illustrated in FIG. 5, pixels composing the imaging device are sorted into two types of pixels of pixels set to first exposure conditions (short-period exposure) and pixels set to second exposure conditions (long-period exposure).

In FIG. 5, pixels which are shaded are images exposed under the first exposure conditions, while pixels which are not shaded are pixels exposed under the second exposure conditions. As in FIG. 5, a pixel array which has pixels exposed for different exposure periods like short-period exposure pixels and long-period exposure pixels within one imaging device is referred to as a spatially varying exposure (SVE) array.

The pixel arrangement illustrated in FIG. 5 is arrangement of R pixels, G pixels and B pixels arranged in one to eight rows and one to eight columns. FIG. 5 illustrates part of the image sensor, and R pixels, G pixels and B pixels arranged in other rows and columns other than one to eight rows and one to eight columns have the same configurations as those of the R pixels, the G pixels and the B pixels arranged in one to eight rows and one to eight columns.

In the following description, for example, while a pixel is described as 10(m, n), m indicates a row and n indicates a column. Further, the row is a horizontal direction in which a horizontal signal line (not illustrated) is disposed, while the column is a vertical direction in which a vertical signal line (not illustrated) is disposed. For example, a pixel 200(2, 1) indicates a pixel positioned in the second row in the first column. Further, here, an upper left pixel is set as a pixel 200(1, 1), and a position of each pixel is indicated based on this pixel 200(1, 1). Other drawings will be indicated in the same way.

A configuration of the image sensor in a horizontal direction (a horizontal direction in FIG. 5 and a row direction) will be described. In the first row, an R pixel 200(1, 1), a G pixel 200(1, 2), a G pixel 200(1, 4), an R pixel 200(1, 5), a G pixel 200(1, 6) and a G pixel 200(1, 8) exposed under the first exposure conditions and an R pixel 200(1, 3) and an R pixel 200(1, 7) exposed under the second exposure conditions are arranged.

In this case, R pixels and G pixels are alternately arranged in the first row. Further, as the R pixels 200 in the first row, pixels exposed under the first exposure conditions and pixels exposed under the second exposure conditions are alternately arranged. Still further, the G pixels 200 in the first row are all exposed under the first exposure conditions.

In the second row, a B pixel 200(2, 2) and a B pixel 200(2, 6) exposed under the first exposure conditions, and a G pixel 200(2, 1), a G pixel 200(2, 3), a B pixel 200(2, 4), a G pixel 200(2, 5), a G pixel 200(2, 7) and a B pixel 200(2, 8) exposed under the second exposure conditions are arranged.

In this case, in the second row, the G pixels and the B pixels are alternately arranged. Further, as the B pixels 200 in the second row, pixels exposed under the first exposure conditions and pixels exposed under the second exposure conditions are alternately arranged. Still further, the G pixels 200 in the second row are all exposed under the second exposure conditions.

While the third row is different from the first row in that pixels are arranged, starting from an R pixel (3, 1) exposed under the second exposure conditions, as in the first row, R pixels and G pixels are alternately arranged, as the arranged R pixels 200, pixels exposed under the first exposure conditions and pixels exposed under the second exposure conditions are alternately arranged, and the arranged G pixels 200 are all exposed under the first exposure conditions.

While the fourth row is different from the second row in that pixels are arranged, starting from a G pixel (4, 1) and a B pixel 200(4, 2) exposed under the second exposure conditions, as in the second row, the G pixels and the B pixels are alternately arranged, as the arranged B pixels, pixels exposed under the first exposure conditions and pixels exposed under the second exposure conditions are alternately arranged, and the arranged G pixels 200 are all exposed under the second exposure conditions.

R pixels, G pixels and B pixels are respectively arranged in the fifth row in a similar manner to in the first row, in the sixth row in a similar manner to in the second row, in the seventh row in a similar manner to in the third row, and in the eighth row in a similar manner to in the fourth row.

While description will be provided using an example of the pixel arrangement illustrated in FIG. 5 in the following description, the present technology is not limited to be applied to the pixel arrangement illustrated in FIG. 5, and can be also applied to other pixel arrangement. Examples of other pixel arrangement will be described with reference to FIG. 6 to FIG. 12.

Figure 6:
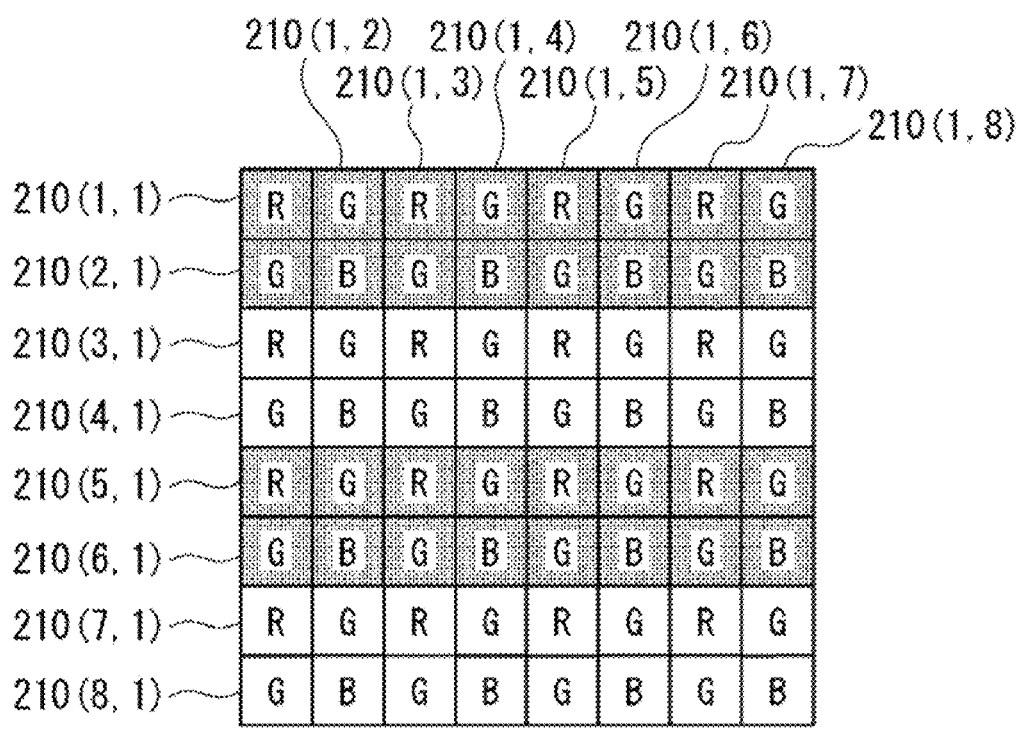
FIG. 6 is a diagram illustrating an arrangement example of pixels with different exposure periods.

FIG. 6 is a diagram illustrating another example of the pixel arrangement. In the first row in the pixel arrangement illustrated in FIG. 6, an R pixel 210(1, 1), a G pixel 210(1, 2), an R pixel 210(1, 3), a G pixel 210(1, 4), an R pixel 210(1, 5), a G pixel 210(1, 6), an R pixel 210(1, 7) and a G pixel 210(1, 8) exposed under the first exposure conditions are arranged.

In this case, in the first row, R pixels and G pixels, which are all exposed under the first exposure conditions (short-period exposure), are alternately arranged.

In the second row, a G pixel 210(2, 1), a B pixel 210(2, 2), a G pixel 210(2, 3), a B pixel 210(2, 4), a G pixel 210(2, 5), a B pixel 210(2, 6), a G pixel 210(2, 7) and a B pixel 210(2, 8) exposed under the first exposure conditions are arranged.

In this case, in the second row, G pixels and B pixels, which are all exposed under the first exposure conditions (short-period exposure), are alternately arranged.

In the third row, an R pixel 210(3, 1), a G pixel 210(3, 2), an R pixel 210(3, 3), a G pixel 210(3, 4), an R pixel 210(3, 5), a G pixel 210(3, 6), an R pixel 210(3, 7) and a G pixel 210(3, 8) exposed under the second exposure conditions are arranged.

In this case, in the third row, R pixels and G pixels, which are all exposed under the second exposure conditions (long-period exposure), are alternately arranged.

In the fourth row, a G pixel 210(4, 1), a B pixel 210(4, 2), a G pixel 210(4, 3), a B pixel 210(4, 4), a G pixel 210(4, 5), a B pixel 210(4, 6), a G pixel 210(4, 7) and a B pixel 210(4, 8) exposed under the second exposure conditions are arranged.

In this case, in the fourth row, G pixels and B pixels, which are all exposed under the second exposure conditions (long-period exposure), are alternately arranged.

R pixels, G pixels and B pixels are respectively arranged in the fifth row in a similar manner to in the first row, in the sixth row in a similar manner to in the second row, in the seventh row in a similar manner to in the third row, and in the eighth row in a similar manner to in the fourth row.

The present technology can be also applied to such pixel arrangement.

Figure 7:
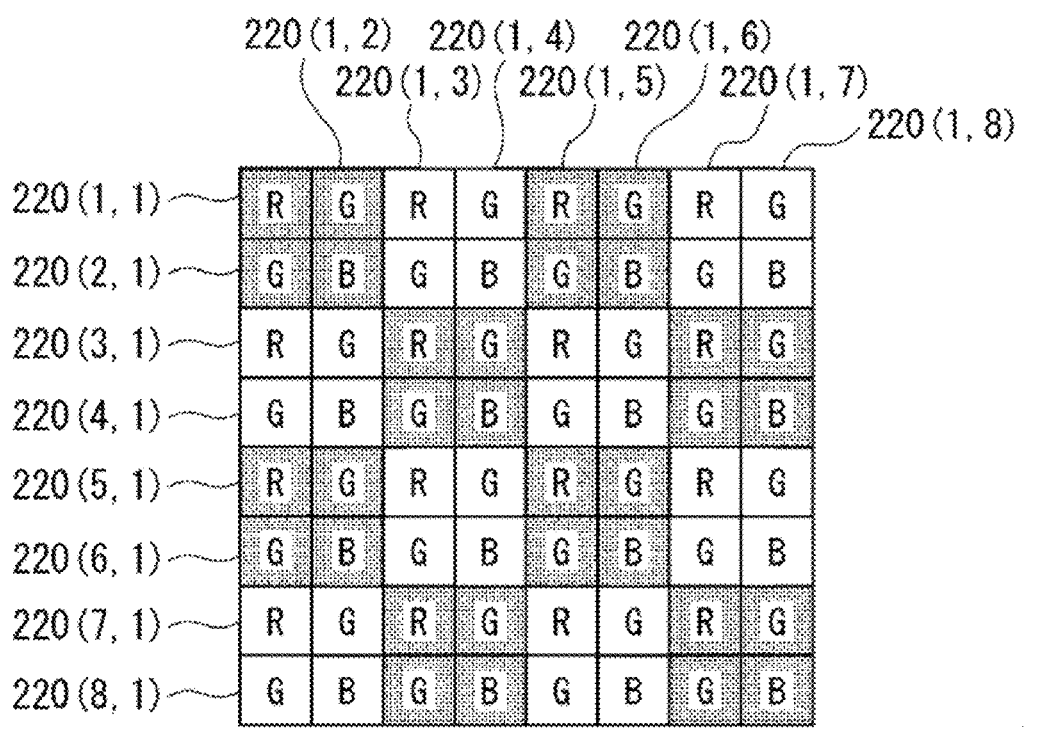

FIG. 7 is a diagram illustrating another example of the pixel arrangement. In the first row in the pixel arrangement illustrated in FIG. 7, an R pixel 220(1, 1), a G pixel 220(1, 2), an R pixel 220(1, 5) and a G pixel 220(1, 6) exposed under the first exposure conditions and an R pixel 220(1, 3), a G pixel 220(1, 4), an R pixel 220(1, 7) and a G pixel 220(1, 8) exposed under the second exposure conditions are arranged.

In this case, in the first row, R pixels and G pixels are alternately arranged, and as each of the R pixels and the G pixels, pixels exposed under the first exposure conditions and pixels exposed under the second exposure conditions are alternately arranged.

In the second row, a G pixel 220(2, 1), a B pixel 220(2, 2), a G pixel 220(2, 5) and a B pixel 220(2, 6) exposed under the first exposure conditions and a G pixel 220(2, 3), a B pixel 220(2, 4), a G pixel 220(2, 7) and a B pixel 220(2, 8) exposed under the second exposure conditions are arranged.

In this case, in the second row, G pixels and B pixels are alternately arranged, and as each of the G pixels and the B pixels, pixels exposed under the first exposure conditions and pixels exposed under the second exposure conditions are alternately arranged.

While the third row is different from the first row in that pixels are arranged, starting from an R pixel 220(3,1) and a G pixel 220(3, 2) exposed under the second exposure conditions, as in the first row, R pixels and G pixels are alternately arranged, and as each of the arranged R pixels and G pixels, pixels exposed under the first exposure conditions and pixels exposed under the second exposure conditions are alternately arranged.

While the fourth row is different from the second row in that pixels are arranged, starting from a G pixel 220(4, 1) and a B pixel 220(4, 2) exposed under the second exposure conditions, as in the second row, the arranged G pixels and B pixels are alternately arranged, and as each of the G pixels and the B pixels, pixels exposed under the first exposure conditions and pixels exposed under the second exposure conditions are alternately arranged.

R pixels, G pixels and B pixels are respectively arranged in the fifth row in a similar manner to in the first row, in the sixth row in a similar manner to in the second row, in the seventh row in a similar manner to in the third row, and in the eighth row in a similar manner to in the fourth row.

The present technology can be also applied to such pixel arrangement.

Figure 8:
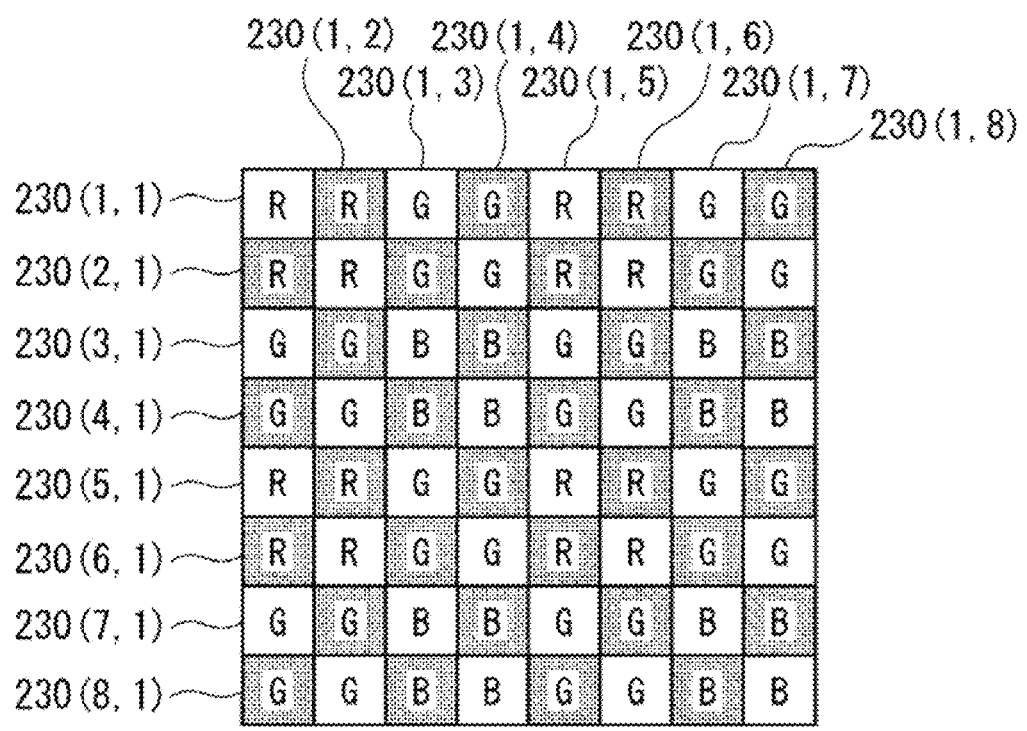
FIG. 8 is a diagram illustrating an arrangement example of pixels with different exposure periods.

FIG. 8 is a diagram illustrating another example of the pixel arrangement. In the pixel arrangement illustrated in FIG. 8, four pixels of 2×2 vertically and horizontally are illustrated with the same color, and pixels of the first exposure conditions and pixels of the second exposure conditions are arranged in a checkered pattern.

Among four pixels of 2×2 arranged in the first row and the second row, four pixels of an R pixel 230(1, 1), an R pixel 230(1, 2), an R pixel 230(2, 1) and an R pixel 230(2, 2) are R (red) pixels, the R pixel 230(1, 1) and the R pixel 230(2, 2) being exposed under the second exposure conditions, and the R pixel 230(1, 2) and the R pixel 230(2, 1) being exposed under the first exposure conditions. Four red pixels having such arrangement will be described as an R pixel block.

Among four pixels of 2×2 arranged in the first row and the second row adjacent to such an R pixel block, four pixels of a G pixel 230(1, 3), a G pixel 230(1, 4), a G pixel 230(2, 3) and a G pixel 230(2, 4) are G (green) pixels, the G pixel 230(1, 3) and the G pixel 230(2, 4) being exposed under the second exposure conditions, and the G pixel 230(1, 4) and the G pixel 230(2, 3) being exposed under the first exposure conditions. Four green pixels having such arrangement will be described as a G pixel block.

In the first row and the second row, R pixel blocks and G pixel blocks are alternately arranged.

In the third row and the fourth row, G pixel blocks each constituted with a G pixel 230(3, 1), a G pixel 230(3, 2), a G pixel 230(4, 1) and a G pixel 230(4, 2) are arranged.

Among four pixels of 2×2 arranged in the third row and the fourth row adjacent to the G pixel block, four pixels of a B pixel 230(3, 3), a B pixel 230(3, 4), a B pixel 230(4, 3) and a B pixel 230(4, 4) are B (green) pixels, the B pixel 230(3, 3) and the B pixel 230(4, 4) being exposed under the second exposure conditions, and the B pixel 230(3, 4) and the B pixel 230(4, 3) being exposed under the first exposure conditions. Four blue pixels having such arrangement will be described as a B pixel block.

In the third row and the fourth row, G pixel blocks and B pixel blocks are alternately arranged.

In the fifth row and the sixth row, as in the first row and the second row, R pixel blocks and G pixel blocks are alternately arranged. In the seventh row and the eighth row, as in the third row and the fourth row, G pixel blocks and B pixel blocks are alternately arranged.

The present technology can be also applied to such pixel arrangement.

FIG. 9 is a diagram illustrating another example of the pixel arrangement. While the pixel arrangement illustrated in FIG. 9 has the same color arrangement as the pixel arrangement illustrated in FIG. 8, the pixel arrangement illustrated in FIG. 9 is different from the pixel arrangement illustrated in FIG. 8 in arrangement of pixels having different exposure conditions.

Among four pixels of 2×2 arranged in the first row and the second row, among four pixels of an R' pixel block constituted with an R pixel 240(1, 1), an R pixel 240(1, 2), an R pixel 240(2, 1) and an R pixel 240(2, 2), the R pixel 240(1, 1) and the R pixel 240(1, 2) are exposed under the first exposure conditions, and the R pixel 240(2, 1) and the R pixel 240(2, 2) are exposed under the second exposure conditions.

Among four pixels of 2×2 arranged in the first row and the second row adjacent to such an R' pixel block, among four pixels of a G' pixel block constituted with a G pixel 240(1, 3), a G pixel 240(1, 4), a G pixel 240(2, 3) and a G pixel 240(2, 4), the G pixel 240(1, 3) and the G pixel 240(1, 4) are exposed under the first exposure conditions, and the G pixel 240(2, 3) and the G pixel 240(2, 4) are exposed under the second exposure conditions.

In the third row and the fourth row, G' pixel blocks each constituted with a G pixel 240(3, 1), a G pixel 240(3, 2), a G pixel 240(4, 1) and a G pixel 240(4, 2) are arranged.

Among four pixels of 2×2 arranged in the third row and the fourth row adjacent to the G' pixel block, among four pixels of a B' pixel block constituted with a B pixel 240(3, 3), a B pixel 240(3, 4), a B pixel 240(4, 3) and a B pixel 240(4, 4), the B pixel 240(3, 3) and the B pixel 240(3, 4) are exposed under the first exposure conditions, and the B pixel 240(4, 3) and the B pixel 240(4, 4) are exposed under the second exposure conditions.

In the fifth row and the sixth row, as in the first row and the second row, R' pixel blocks and G' pixel blocks are alternately arranged. In the seventh row and the eighth row, as in the third row and the fourth row, G' pixel blocks and B' pixel blocks are alternately arranged.

In the pixel arrangement illustrated in FIG. 9, pixels exposed under the first exposure conditions are arranged in odd rows, and pixels exposed under the second exposure conditions are arranged in even rows.

The present technology can be also applied to such pixel arrangement.

Figure 10:
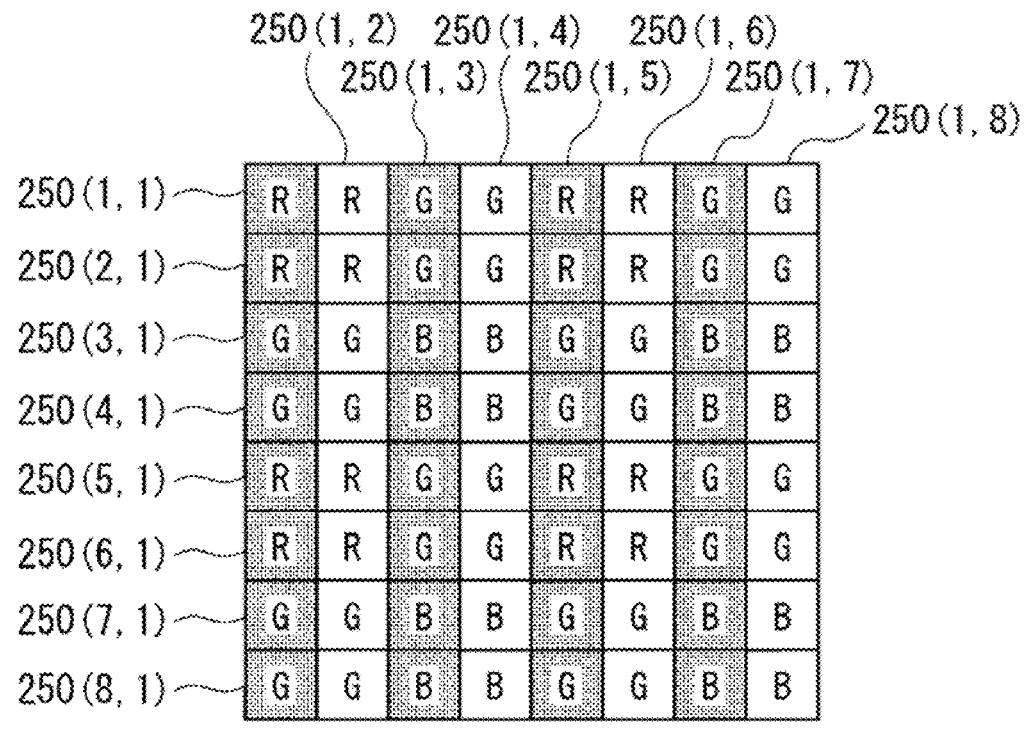

FIG. 10 is a diagram illustrating another example of the pixel arrangement. While the pixel arrangement illustrated in FIG. 10 has the same color arrangement as the pixel arrangement illustrated in FIG. 8, the pixel arrangement illustrated in FIG. 10 is different from the pixel arrangement illustrated in FIG. 8 in arrangement of pixels having different exposure conditions.

Among four pixels of 2×2 arranged in the first row and the second row, among four pixels of an R" pixel block constituted with an R pixel 250(1, 1), an R pixel 250(1, 2), an R pixel 250(2, 1) and an R pixel 250(2, 2), the R pixel 250(1, 1) and the R pixel 250(2, 1) are exposed under the first exposure conditions, and the R pixel 250(1, 2) and the R pixel 250(2, 2) are exposed under the second exposure conditions.

Among four pixels of 2×2 arranged in the first row and the second row adjacent to such an R" pixel block, among four pixels of a G" pixel block constituted with a G pixel 250(1, 3), a G pixel 250(1, 4), a G pixel 250(2, 3) and a G pixel 250(2, 4), the G pixel 250(1, 3) and the G pixel 250(2, 3) are exposed under the first exposure conditions, and the G pixel 250(1, 4) and the G pixel 250(2, 4) are exposed under the second exposure conditions.

In the third row and the fourth row, G" pixel blocks each constituted with a G pixel 250(3, 1), a G pixel 250(3, 2), a G pixel 250(4, 1) and a G pixel 250(4, 2) are arranged.

Among four pixels of 2×2 arranged in the third row and the fourth row adjacent to the G" pixel block, among four pixels of a B" pixel block constituted with a B pixel 250(3, 3), a B pixel 250(3, 4), a B pixel 250(4, 3) and a B pixel 250(4, 4), the B pixel 250(3, 3) and the B pixel 250(4, 3) are exposed under the first exposure conditions, and the B pixel 250(3, 4) and the B pixel 250(4, 4) are exposed under the second exposure conditions.

In the fifth row and the sixth row, as in the first row and the second row, R" pixel blocks and G" pixel blocks are alternately arranged. In the seventh row and the eighth row, as in the third row and the fourth row, G" pixel blocks and B" pixel blocks are alternately arranged.

In the pixel arrangement illustrated in FIG. 10, pixels exposed under the first exposure conditions are arranged in odd rows, and pixels exposed under the second exposure conditions are arranged in even rows.

The present technology can be also applied to such pixel arrangement.

Figure 11:
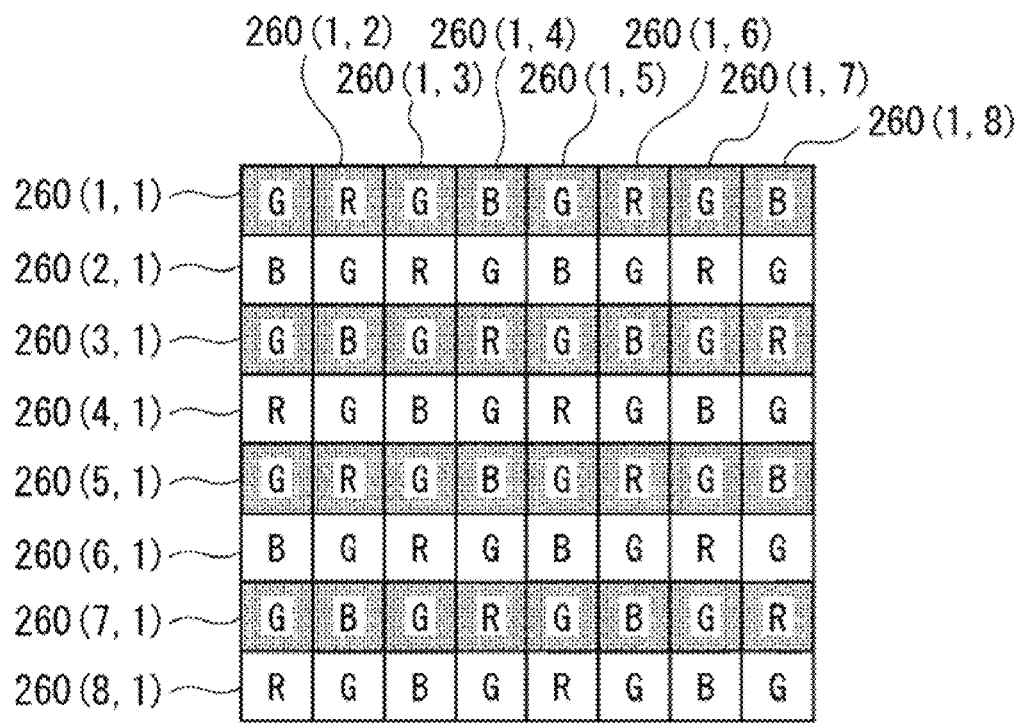
FIG. 11 is a diagram illustrating an arrangement example of pixels with different exposure periods.

FIG. 11 is a diagram illustrating another example of the pixel arrangement. In the pixel arrangement illustrated in FIG. 11, in the first row, a G pixel 260(1, 1), an R pixel 260(1, 2), a G pixel 260(1, 3), a B pixel 260(1, 4), a G pixel 260(1, 5), an R pixel 260(1, 6), a G pixel 260(1, 7) and a B pixel 260(1, 8) exposed under the first exposure conditions are arranged.

In this case, in the first row, R pixels, G pixels and B pixels, which are all exposed under the first exposure conditions (short-period exposure), are arranged.

In the second row, a B pixel 260(2, 1), a G pixel 260(2, 2), an R pixel 260(2, 3), a G pixel 260(2, 4), a B pixel 260(2, 5), a G pixel 260(2, 6), an R pixel 260(2, 7) and a G pixel 260(2, 8) exposed under the second exposure conditions are arranged.

In this case, in the second row, R pixels, G pixels and B pixels, which are all exposed under the second exposure conditions (long-period exposure), are arranged.

In the third row, a G pixel 260(3, 1), a B pixel 260(3, 2), a G pixel 260(3, 3), an R pixel 260(3, 4), a G pixel 260(3, 5), a B pixel 260(3, 6), a G pixel 260(3, 7) and an R pixel 260(3, 8) exposed under the first exposure conditions are arranged.

In this case, in the third row, R pixels, G pixels and B pixels, which are all exposed under the first exposure conditions (short-period exposure), are arranged.

In the fourth row, an R pixel 260(4, 1), a G pixel 260(4, 2), a B pixel 260(4, 3), a G pixel 260(4, 4), an R pixel 260(4, 5), a G pixel 260(4, 6), a B pixel 260(4, 7) and a G pixel 260(4, 8) exposed under the second exposure conditions are arranged.

In this case, in the fourth row, R pixels, G pixels and B pixels, which are all exposed under the second exposure conditions (long-period exposure) are arranged.

R pixels, G pixels and B pixels are respectively arranged in the fifth row in a similar manner to in the first row, in the sixth row in a similar manner to in the second row, in the seventh row in a similar manner to in the third row, and in the eighth row in a similar manner to in the fourth row.

The present technology can be also applied to such pixel arrangement.

As described above, the present technology can be applied to an imaging apparatus including, for example, a charge coupled device (CCD) sensor, a complementary metal oxide semiconductor (CMOS) sensor, or the like, as an imaging device included in the imaging apparatus. Further, the present technology can be applied to an image sensor in which three pixels which output color light of R (red), G (green) and B (blue) are arranged. Still further, the present technology can be also applied to an image sensor in which four pixels which output color light of R (red), G (green), B (blue) and W (white) are arranged as illustrated in FIG. 12.

Figure 12:
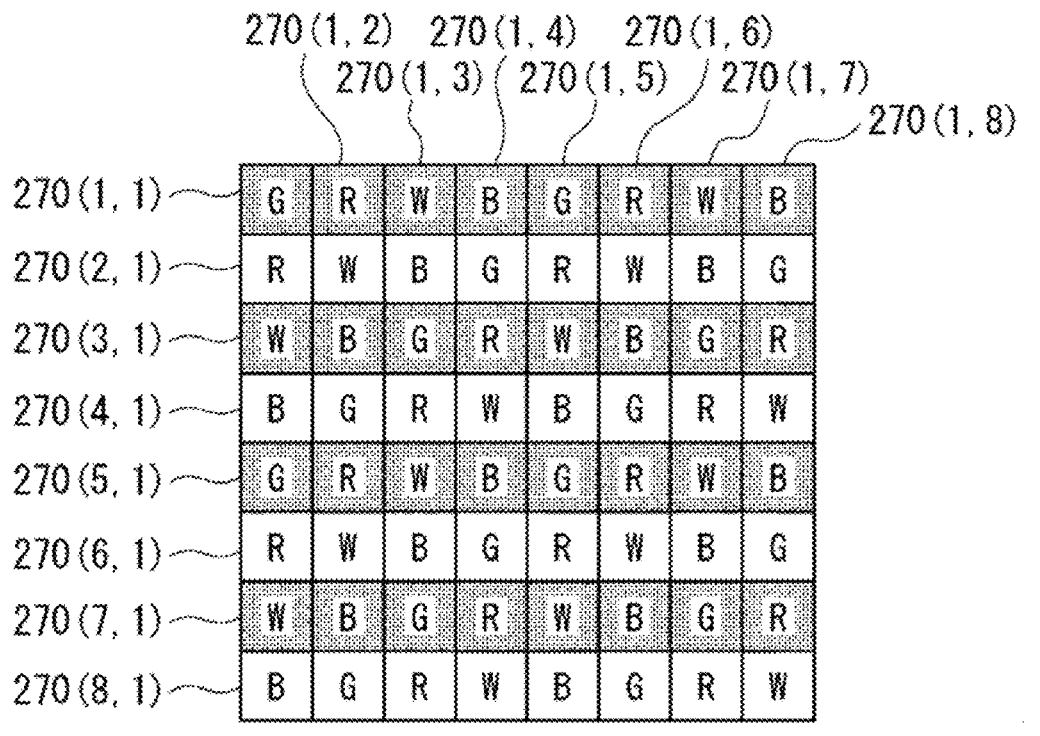

Four pixels which output color light of R (red), G (green), B (blue) and W (white) are, for example, arranged in matrix in a display area as illustrated in FIG. 12. A W pixel functions as a pixel having panchromatic spectral sensitivity, and an R pixel, a G pixel and a B pixel function as pixels having spectral sensitivity having characteristics of respective colors.

FIG. 12 is a diagram illustrating another example of the pixel arrangement and illustrates an example of the pixel arrangement including W pixels. In the pixel arrangement illustrated in FIG. 12, in the first row, a G pixel 270(1, 1), an R pixel 270(1, 2), a W pixel 270(1, 3), a B pixel 270(1, 4), a G pixel 270(1, 5), an R pixel 270(1, 6), a W pixel 270(1, 7) and a B pixel 270(1, 8) exposed under the first exposure conditions are arranged.

In this case, in the first row, R pixels, G pixels, B pixels and W pixels, which are all exposed under the first exposure conditions (short-period exposure) are arranged.

In the second row, an R pixel 270(2, 1), a W pixel 270(2, 2), a B pixel 270(2, 3), a G pixel 270(2, 4), an R pixel 270(2, 5), a W pixel 270(2, 6), a B pixel 270(2, 7) and a G pixel 270(2, 8) exposed under the second exposure conditions are arranged.

In this case, in the second row, R pixels, G pixels, B pixels and W pixels, which are all exposed under the second exposure conditions (long-period exposure), are arranged.

In the third row, a W pixel 270(3, 1), a B pixel 270(3, 2), a G pixel 270(3, 3), an R pixel 270(3, 4), a W pixel 270(3, 5), a B pixel 270(3, 6), a G pixel 270(3, 7) and an R pixel 270(3, 8) exposed under the first exposure conditions are arranged.

In this case, in the third row, R pixels, G pixels, B pixels and W pixels, which are all exposed under the first exposure conditions (short-period exposure), are arranged.

In the fourth row, a B pixel 270(4, 1), a G pixel 270(4, 2), an R pixel 270(4, 3), a W pixel 270(4, 4), a B pixel 270(4, 5), a G pixel 270(4, 6), an R pixel 270(4, 7) and a W pixel 270(4, 8) exposed under the second exposure conditions are arranged.

In this case, in the fourth row, R pixels, G pixels, B pixels and W pixels, which are all exposed under the second exposure conditions (long-period exposure), are arranged.

R pixels, G pixels, B pixels and W pixels are respectively arranged in the fifth row in a similar manner to in the first row, in the sixth row in a similar manner to in the second row, in the seventh row in a similar manner to in the third row, and in the eighth row in a similar manner to in the fourth row.

The present technology can be also applied to such pixel arrangement.

The pixel arrangement described with reference to FIG. 5 to FIG. 12 is an example, and the present technology can be also applied to pixel arrangement which is not described.

Further, when one image is picked up, while description will be continued using the example as described above where an image is picked up using short-period exposure (the first exposure conditions) and long-period exposure (the second exposure conditions) at the same time, the present technology can be also applied to a case where an image upon short-period exposure and an image upon long-period exposure are acquired by alternately picking up a short-period exposure image and a long-period exposure image with normal pixels without separating pixels for short-period exposure from pixels for long-period exposure.

In this case, because imaging timings are different, the present technology can be applied by using a matrix which takes into account the imaging timings as a matrix to be used for operation upon flicker correction which will be described later.

Further, while, in the above-described example, description has been provided using an example of an imaging apparatus which picks up images using two types of exposure periods of short-period exposure and long-period exposure, the present technology can be also applied to an imaging apparatus in which picked up images with three or more types of exposure periods are combined.

When picked up images with three or more types of exposure periods are combined, it is also possible to estimate a first flicker component from a first exposure image and a second exposure image and convert and estimate a third flicker component from the first flicker component. Further, it is also possible to obtain solution by generating a matrix by combining all the first exposure image, the second exposure image and the third exposure image. A method for obtaining flicker components will be described later.

Further, while, in the above-described embodiment, an example in the case where spectral sensitivity of pixels of the imaging device is RGB or RG+W has been described, the spectral sensitivity does not become a constraint when the present technology is used. That is, it is also possible to use pixels having spectral sensitivity other than RGB and RGB+W. For example, it is also possible to combine four rows including G in addition to complementary colors such as Y (yellow), C (cyan) and M (magenta).

In the following description, description will be provided using an example of the pixel arrangement illustrated in FIG. 5.

Figure 13:
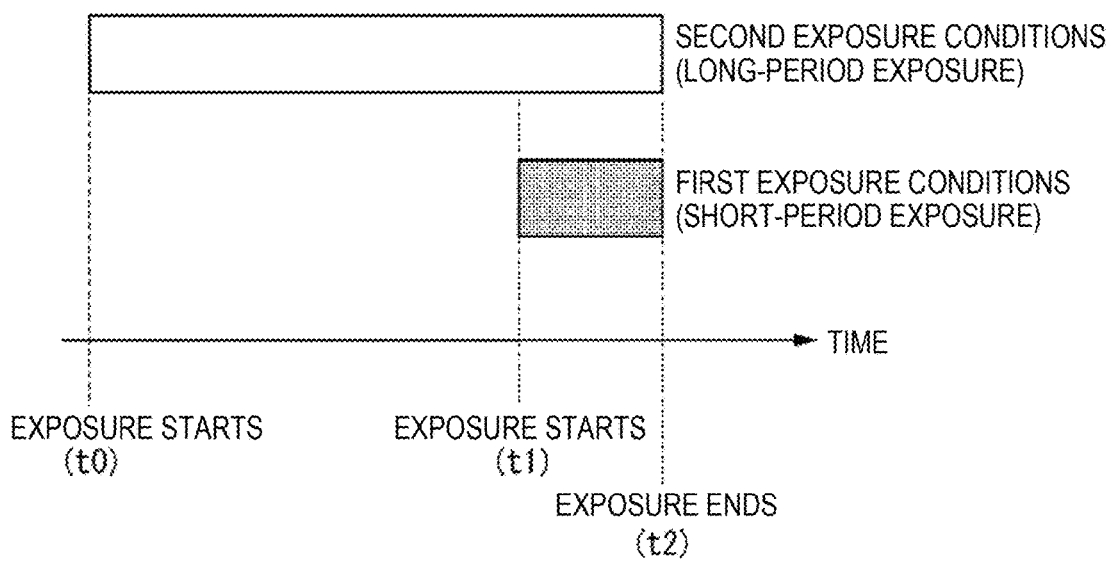
FIG. 13 is a diagram illustrating different exposure periods.

FIG. 13 illustrates a setting example of exposure periods of respective pixels. Pixels set at the first exposure conditions (short-period exposure) are subjected to exposure processing of a short period. Pixels set at the second exposure conditions (long-period exposure) are subjected to exposure processing of a long period. It should be noted that this exposure control in units of pixels is performed by, for example, a control unit 105 of the imaging apparatus 100 illustrated in FIG. 4 outputting a control signal to the imaging device 102.

<Configuration of Image Processing Unit>

Figure 14:
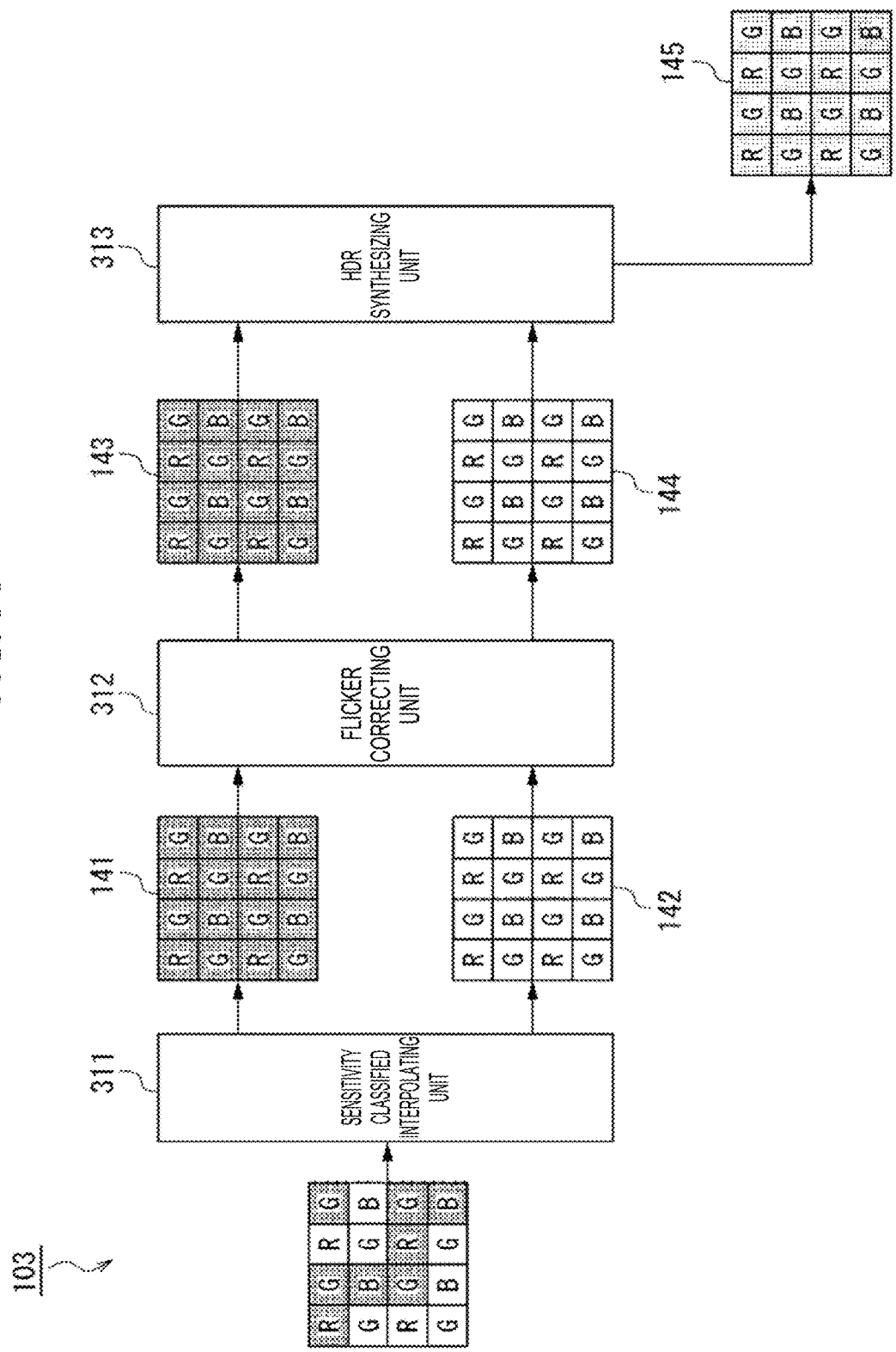
FIG. 14 is a diagram for explaining a configuration of an image processing unit.

Next, details of the image processing unit 103 of the imaging apparatus 100 illustrated in FIG. 4 will be described. First, processing executed by the image processing unit 103 will be described with reference to FIG. 14. As illustrated in FIG. 14, the image processing unit 103 has a sensitivity classified interpolating unit 311, a flicker correcting unit 312 and an HDR synthesizing unit (high dynamic range image synthesizing unit) 313.

The sensitivity classified interpolating unit 311 receives input of an image of an SVE array having short-period exposure pixels and long-period exposure pixels within one imaging device as illustrated in FIG. 5, and generates and outputs a first exposure image 141 in which the whole screen is exposed for a short period and a second exposure image 142 in which the whole screen is exposed for a long period. A color array of the outputted image may be equal to a color array of the inputted image (in the present example, a Bayer array), or may be an image after being subjected to demosaicing in which RGB are put together in one pixel position. Here, an example will be described where the color array of the outputted image is equal to the color array of the inputted image (in the present example, a Bayer array).

Figure 15:
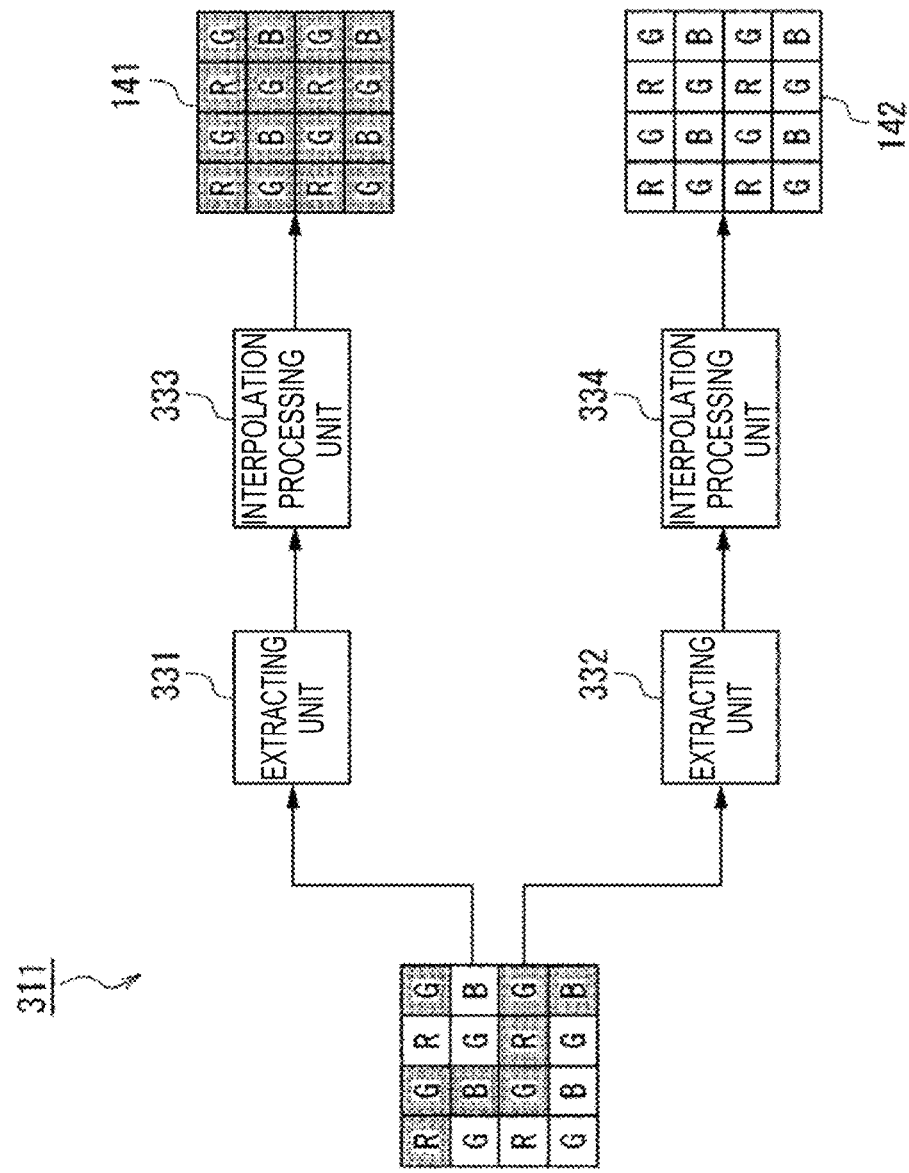
FIG. 15 is a diagram for explaining a configuration of a sensitivity classified interpolating unit.

FIG. 15 illustrates a detailed configuration example of the sensitivity classified interpolating unit 311. As illustrated in FIG. 11, the sensitivity classified interpolating unit 311 has extracting units 331 and 332 configured to extract only pixels of any sensitivity of short-period exposure pixels and long-period exposure pixels, and interpolation processing units 333 and 334 configured to set pixel values of pixel portions of other sensitivity by utilizing pixels having respective sensitivity and generate a first exposure image 141 formed with only low-sensitivity pixels (short-period exposure pixels) and a second exposure image 142 formed with only high-sensitivity pixels (long-period exposure pixels).

The extracting units 331 and 332 extract pixels of sensitivity and color desired to be interpolated from peripheral pixels, and the interpolation processing units 333 and 334 perform interpolation processing. It should be noted that it is also possible to perform interpolation by utilizing a method which uses a simple LPF for a pixel value of sensitivity according to the generated image, a method in which an edge direction of an image is estimated from peripheral pixels and interpolation is performed using a pixel value in a direction along the edge as a reference pixel value, or the like.

The sensitivity classified interpolating unit 311 receives input of an SVE array having long-period exposure pixels and short-period exposure pixels within the imaging device as illustrated in FIG. 4 by applying the configuration in FIG. 15, and generates and outputs a first exposure image 141 in which the whole screen is exposed for a short period and a second exposure image 142 in which the whole screen is exposed for a long period.

Description will be returned to description of the image processing unit 103 illustrated in FIG. 14. The first exposure image 141 and the second exposure image 142 outputted from the sensitivity classified interpolating unit 311 are supplied to the flicker correcting unit 312. The flicker correcting unit 312 generates a flicker-corrected first exposure image 143 and a flicker-corrected second exposure image 144 in which flicker components are suppressed and supplies the flicker-corrected first exposure image 143 and the flicker-corrected second exposure image 144 to the HDR synthesizing unit 313.

Details of a configuration and operation of the flicker correcting unit 312 will be described later as the first to the third embodiments, and description of a configuration and operation of the image processing unit 103 illustrated in FIG. 14 will be continued.

Figure 16:
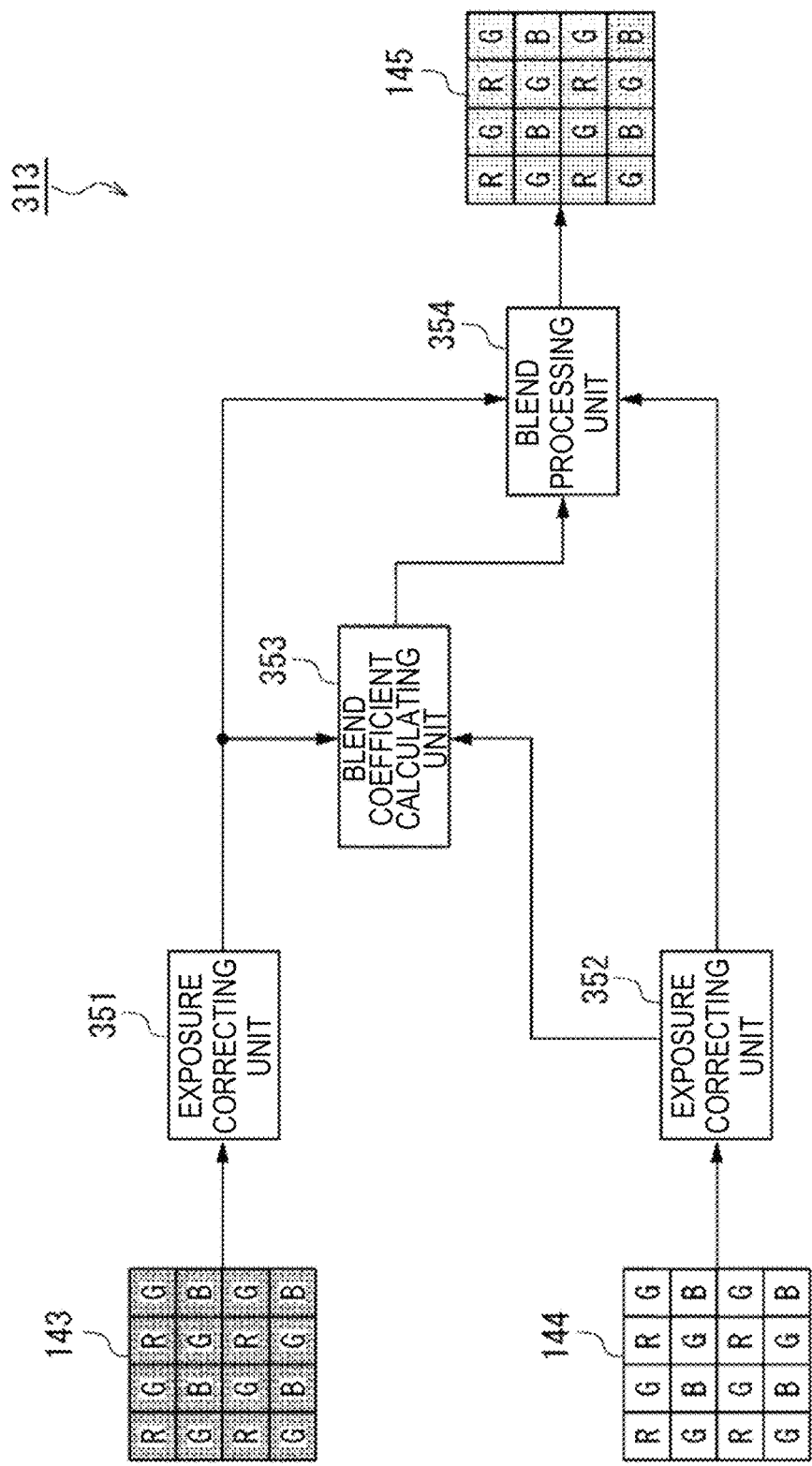
FIG. 16 is a diagram for explaining a configuration of an HDR synthesizing unit.

The HDR synthesizing unit (high dynamic range image synthesizing unit) 313 has a configuration as illustrated in FIG. 16 and performs HDR synthesis. The HDR synthesizing unit 313 illustrated in FIG. 16 has exposure correcting units 351 and 352, a blend coefficient calculating unit 353 and a blend processing unit 354.

The exposure correcting units 351 and 352 match brightness of corresponding pixels of the flicker-corrected first exposure image 143 and the flicker-corrected second exposure image 144 by multiplying a constant according to an exposure period. For example, when the exposure ratio is 1:2, a pixel value of the flicker-corrected first exposure image 143 which is a short-period exposure image is multiplied by 2, while a pixel value of the flicker-corrected second exposure image 144 which is a long-period exposure image is multiplied by 1.

The blend coefficient calculating unit 353 calculates a blend coefficient which indicates how much ratio in units of corresponding pixels should be used to blend a pixel value of the flicker-corrected first exposure image 143 which is a short-period exposure image after exposure is corrected and a pixel value of the flicker-corrected second exposure image 144 which is a long-period exposure image after exposure is corrected.

In this blend coefficient calculation, a blend coefficient is set such that, for example, weight of a pixel value of a short-period exposure image is set greater in a high brightness area, while weight of a pixel value of a long-period exposure image is set greater in a low brightness area. Through such coefficient setting processing, it is possible to express pixel values from the low brightness area to the high brightness area with higher precision.

The blend processing unit 354 executes processing of blending the corresponding pixel values of the flicker-corrected first exposure image 143 for which exposure is corrected and the flicker-corrected second exposure image 144 for which exposure is corrected according to the blend coefficient calculated by the blend coefficient calculating unit 353 and sets each pixel value of a flicker-corrected HDR image 145.

It should be noted that when a pixel value of the flicker-corrected first exposure image 143 for which exposure is corrected is S, a pixel value of the flicker-corrected second exposure image 144 for which exposure is corrected is L, and a blend coefficient is a where 0≤α≤1, a pixel value H of the flicker-corrected HDR image 231 can be calculated using the following formula.

$$H=(1-\alpha)\times S+\alpha\times L$$

The HDR synthesizing unit (high dynamic range image synthesizing unit) 313 generates and outputs the flicker-corrected HDR image 145 in which pixels values from the low brightness area to the high brightness area are expressed with higher precision through these processing.

An HDR image is generated through processing of synthesizing images with different exposure periods at the HDR synthesizing unit (high dynamic range image synthesizing unit) 313. That is, blend processing is executed while, for example, weight of a pixel value of a short-period exposure image is set larger in the high brightness area, while weight of a pixel value of a long-period exposure image is set larger in the low brightness area, and a high dynamic range (HDR) image in which pixel values from the low brightness area to the high brightness area are expressed with higher precision is generated and outputted.

As will be described later, in the image processing apparatus of the present disclosure, in a configuration in which a plurality of images with different exposure periods are inputted to generate a high dynamic range (HDR) image, because a configuration is employed where only a flicker component corresponding to one reference exposure image is calculated, and flicker components of images with other exposure periods are estimated and calculated according to the flicker component of the reference exposure image, it is not necessary to perform processing of individually calculating flicker components of respective images according to respective exposure periods, so that it is possible to realize efficient processing.

It should be noted that the sensitivity classified interpolating unit 311 illustrated in FIG. 15 and the HDR synthesizing unit 313 illustrated in FIG. 16 are examples, and it is also possible to employ other configurations depending on arrangement of pixels under the first exposure conditions and pixels under the second exposure conditions, for example, the pixel arrangement as illustrated in FIG. 5. Further, the present technology can be applied even when the sensitivity classified interpolating unit 311 and the HDR synthesizing unit 313 which perform processing before and after processing at the flicker correcting unit 312 have other configurations depending on processing at the flicker correcting unit 312 which will be described later.

<Configuration of Flicker Correcting Unit>

Figure 17:
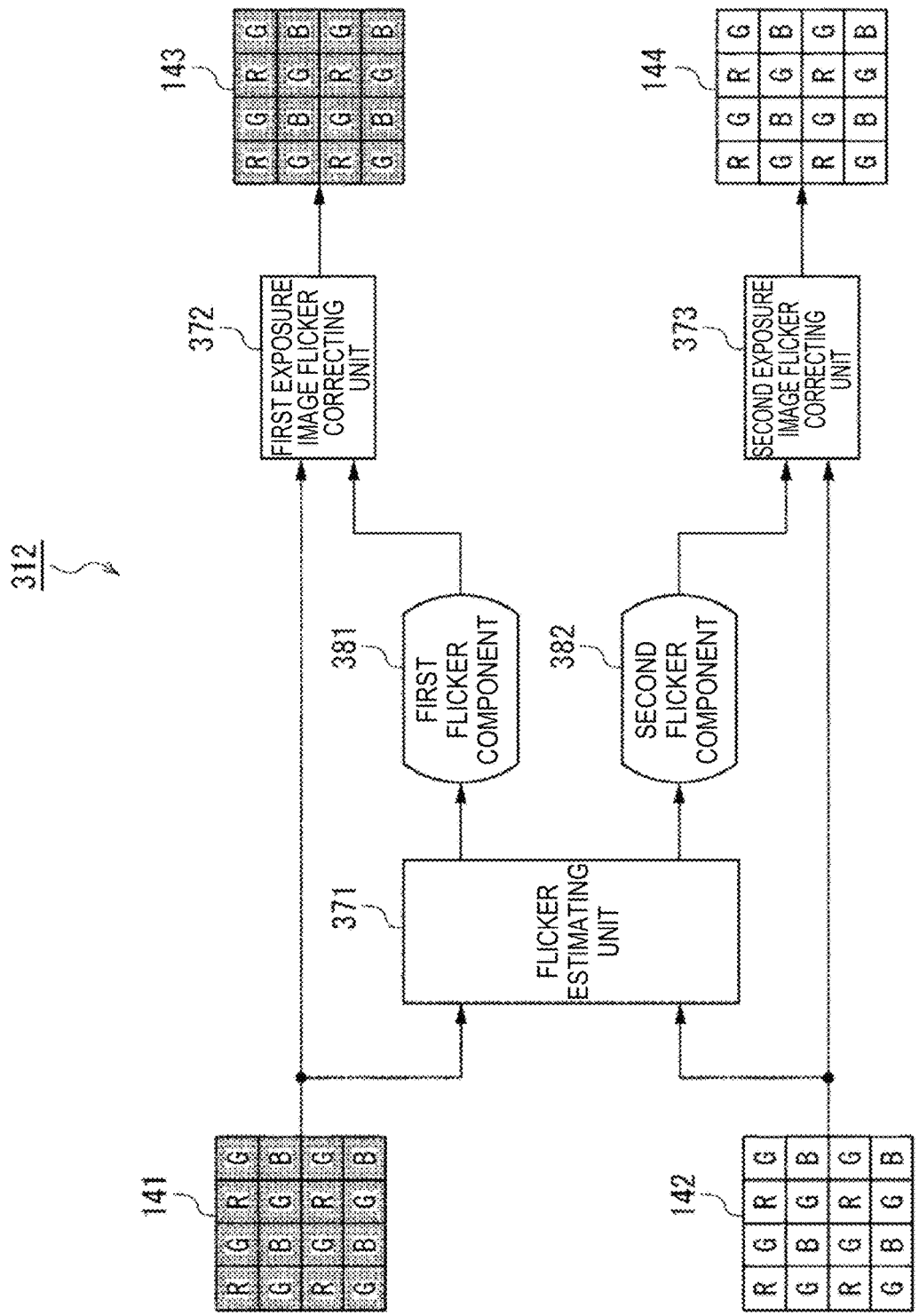
FIG. 17 is a diagram for explaining a configuration of a flicker correcting unit.

FIG. 17 is a diagram illustrating an internal configuration example of the flicker correcting unit 312. The flicker correcting unit 312 has a plurality of embodiments according to operation relating to correction, and, while description will be provided below using examples of the first to the third embodiments, a configuration common among the first to the third embodiments will be described with reference to FIG. 17.

Further, a flicker component for each image is estimated by, in the first and the second embodiments, performing operation using a ratio called a flicker ratio, and, in the third embodiment, performing operation without using a ratio. Further, the first to the third embodiments are common in that a noise component for each image is estimated by performing operation which utilizes mutual relationship between noises having periodicity, such as flicker, included in images picked up under different exposure conditions.

Figure 18:
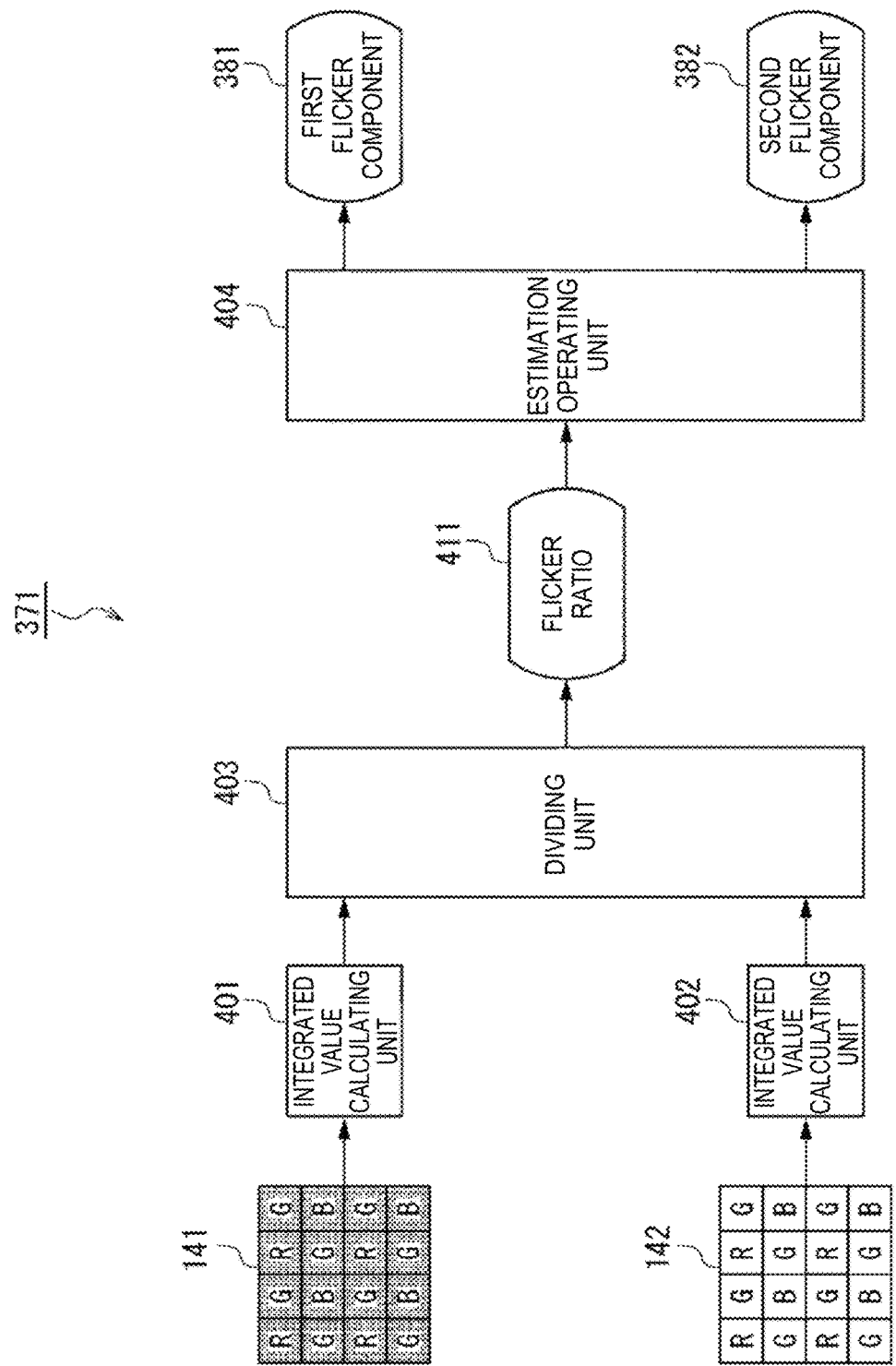
FIG. 18 is a diagram for explaining a configuration of a flicker correcting unit.

The flicker correcting unit 312 illustrated in FIG. 17 is configured to include a flicker estimating unit 371, a first exposure image flicker correcting unit 372 and a second exposure image flicker correcting unit 373. The flicker estimating unit 371 has a configuration as illustrated in FIG. 18, and generates a first flicker component 381 and a second flicker component 382 from the inputted first exposure image 141 and the second exposure image 142.

The first flicker component 381 generated by the flicker estimating unit 371 is supplied to the first exposure image flicker correcting unit 372. The first exposure image 141 is also supplied to the first exposure image flicker correcting unit 372. The first exposure image flicker correcting unit 372 performs flicker correction by multiplying the first exposure image 141 by the reciprocal of the estimated first flicker component 381 for each row, and outputs a flicker-corrected first exposure image 143.

In a similar manner, the second flicker component 382 generated by the flicker estimating unit 371 is supplied to the second exposure image flicker correcting unit 373. The second exposure image 142 is also supplied to the second exposure image flicker correcting unit 373. The second exposure image flicker correcting unit 373 performs flicker correction by multiplying the second exposure image 142 by the reciprocal of the estimated second flicker component 382 for each row, and outputs a flicker-corrected second exposure image 144.

The flicker-corrected first exposure image 143 and flicker-corrected second exposure image 144 corrected in this manner are outputted to the HDR synthesizing unit 313 (FIG. 14).

FIG. 18 is a diagram illustrating an internal configuration example of the flicker estimating unit 371 illustrated in FIG. 17. The flicker estimating unit 371 illustrated in FIG. 18 is configured to include an integrated value calculating unit 401, an integrated value calculating unit 402, a dividing unit 403 and an estimation operating unit 404.

The first exposure image 141 is supplied to the integrated value calculating unit 401, and the second exposure image 142 is supplied to the integrated value calculating unit 402. The integrated value calculating unit 401 integrates the first exposure image 141 in a horizontal direction and outputs the integrated value to the dividing unit 403. In a similar manner, the integrated value calculating unit 402 integrates the second exposure image 142 in a horizontal direction and outputs the integrated value to the dividing unit 403.

The integrated value calculating unit 401 and the integrated value calculating unit 402, which respectively calculate the integrated values of the first exposure image 141 and the second exposure image, may perform processing while targeting at all the pixels or may perform processing while targeting at pixels within a predetermined area.

Further, it is also possible to employ a configuration where pixels at positions where pixels of either the first exposure image 141 or the second exposure image 142 are saturated, are not used for integration operation. For example, a portion which does not include halation, a black defect, a subject portion, or the like, can be set as a portion to be used when integration is performed.

To the dividing unit 403, the integrated value (referred to as a first integrated value) calculated from the first exposure image 141 is supplied from the integrated value calculating unit 401, and the integrated value (referred to as a second integrated value) calculated from the second exposure image 142 is supplied from the integrated value calculating unit 402. The dividing unit 403 obtains a flicker ratio by dividing the supplied first integrated value by the second integrated value. The obtained flicker ratio 411 is supplied to the estimation operating unit 404.

The estimation operating unit 404 respectively calculates the first flicker component 381 and the second flicker component 382 from the flicker ratio 411. Here, calculation of the flicker ratio 411 will be described.

It should be noted that the flicker ratio is a ratio of flicker components of respective images, and, description will be continued here assuming that the flicker ratio is a ratio of the first flicker component 381 and the second flicker component 382. Further, when it is intended to remove noise having a predetermined cycle like flicker, a ratio of noise components for each image corresponds to a flicker ratio described below, and the ratio of noise components can be calculated in a similar manner to the flicker ratio described below.

<Calculation of Flicker Ratio>

Here, the flicker ratio will be described with reference to FIG. 19. Part A in FIG. 19 illustrates the first exposure image 141 and the second exposure image 142 which are examples of images in which there are stripe patterns on the images due to influence of flicker.

Figure 19:
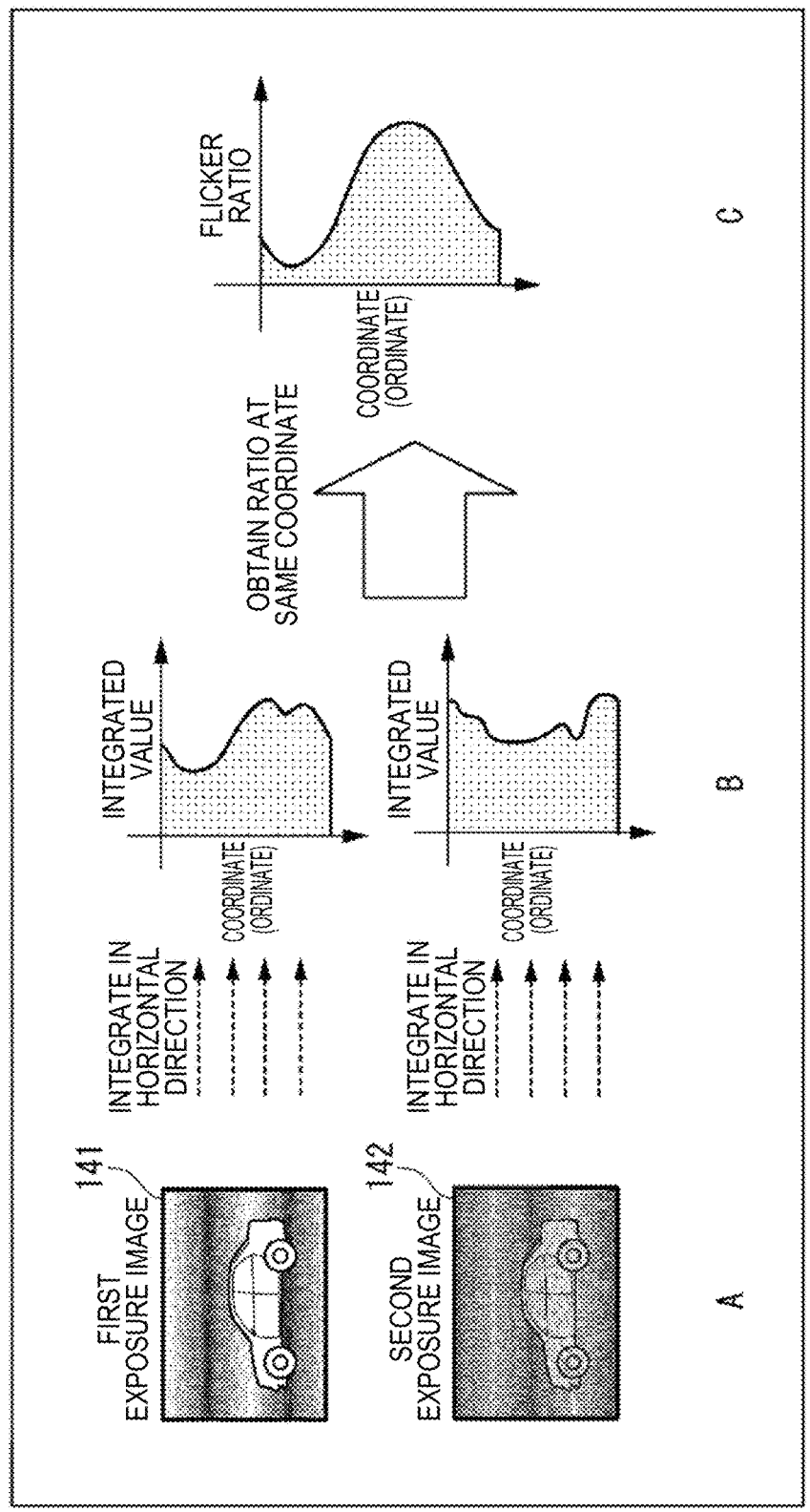
FIG. 19 is a diagram for explaining a flicker ratio.

One example of a result in the case where integration is performed in a horizontal direction on an effective portion of the first exposure image 141 is illustrated in an upper part of part B in FIG. 19. Further, one example of a result in the case where integration is performed in a horizontal direction on an effective portion of the second exposure image 142 is illustrated in a lower portion of part B in FIG. 19. The effective portions used for integration are portions which do not include halation, a black defect, a subject portion, or the like.

By obtaining a ratio for each of the same positions in the horizontal direction for which integration is performed, it is possible to obtain a flicker ratio as illustrated in part C in FIG. 19.

By multiplying one integrated value by a gain so that exposure levels become the same, subject components other than flicker components become the same between two images, and, thus, are cancelled. By this means, because it is only necessary to purely take into account only flicker components in the two images, it is possible to improve accuracy of estimation of flicker components thereafter.

It should be noted that while, in FIG. 19, a flicker ratio is calculated for each ordinate of an image as one example, for example, when the number of cycles of the flicker is known, it is also possible to employ a configuration where coordinates corresponding to the number of cycles of the flicker are provided, and integrated values of the same phase are integrated on the same coordinate.

Such calculation of the flicker ratio will be further described. An observation image affected by flicker can be expressed as follows when exposure completion time on the top row of the exposure image is t, and the exposure period is E.

$$I(x,y,t,E)=I_0(x,y) \times E \times g_t(t+y,E) \qquad (7)$$

In formula (7), $I_0(x, y)$ is a value of a true image which is not affected by flicker in a unit exposure period.

As described above, when the short-period exposure is the first exposure conditions, and the long-period exposure is the second exposure conditions, the exposure period and the exposure completion time are defined as follows.

First exposure conditions: the exposure period is $E_1$, and the exposure completion time on the top row is $t_1$ Second exposure conditions: the exposure period is $E_2$, and the exposure completion time on the top row is $t_2$ Further, $E_1 \leq E_2$.

Further, an image picked up under the first exposure conditions and an image picked up under the second exposure conditions can be respectively expressed with the following formula (8), when simply expressed using the above-described formula (7).

$$I_1(x,y)=I(x,y,t_1,E_1)$$

$$I_2(x,y)=I(x,y,t_2,E_2) \quad (8)$$

When definition is provided as described above, the flicker ratio can be obtained as follows.

The flicker ratio is defined as a ratio of the flicker component under the first exposure conditions and the flicker component under the second exposure conditions. The flicker ratio can be obtained from two exposure images using the following formula (9).

[Math. 6]

$$r_{12}(y) = \frac{E_2 \times \int_{x,y\in\Omega} I_1(x,y)dx}{E_1 \times \int_{x,y\in\Omega} I_2(x,y)dx} = \frac{g_t(y+t_1, E_1)}{g_t(y+t_2, E_2)} \quad (9)$$

However, in order to avoid influence of saturated pixels, integration is executed while an area ($\Omega$) where neither of the first exposure image 141 under the first exposure conditions and the second exposure image 142 under the second exposure conditions is saturated is used as an area for which integration is performed.

Operation performed at each unit of the integrated value calculating unit 401, the integrated value calculating unit 402 and the dividing unit 403 of the flicker estimating unit 371 illustrated in FIG. 18 is performed based on operation in formula (9). The flicker ratio 411 is calculated in this manner.

The following relational expression of formula (10) can be determined using formula (9).

$$r_{12}(y) \times g_t(y+t_2,E_2) = g_1(y+t_1,E_1) \quad (10)$$

If the flicker ratio can be obtained based on formula (9) using formula (10), it is possible to obtain one flicker component (for example, the second flicker component 381) from the other flicker component (for example, the second flicker component 382).

<First Embodiment of Flicker Suppression>

Figure 20:
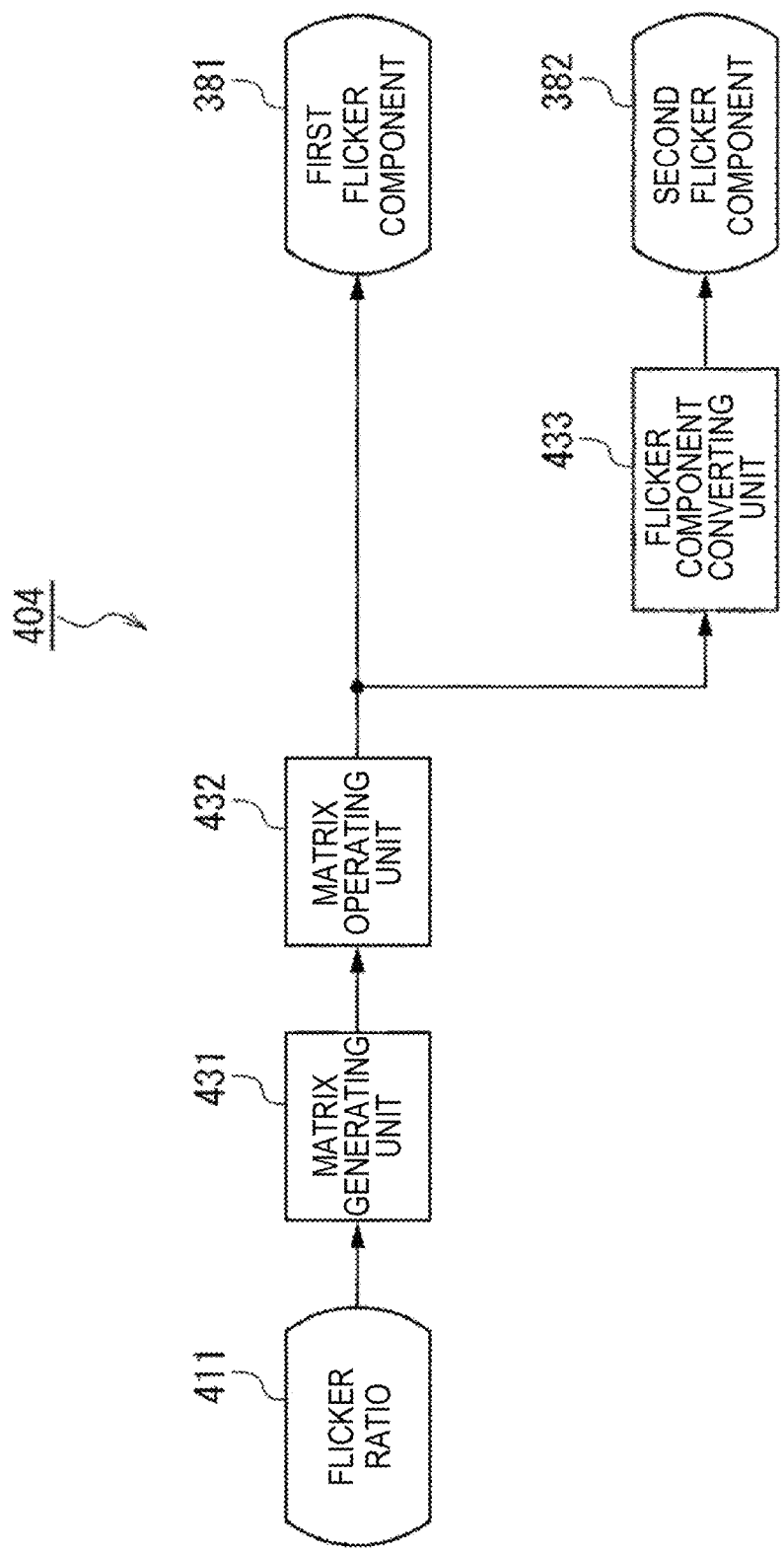
FIG. 20 is a diagram for explaining a configuration of an estimation operating unit.

As the first embodiment, a case will be described where a flicker component is obtained using solution in real space. FIG. 20 is a diagram illustrating an internal configuration diagram of the estimation operating unit 404 of the flicker estimating unit 371 within the flicker correcting unit 312 in the first embodiment.

The estimation operating unit 404 illustrated in FIG. 20 is configured to include a matrix generating unit 431, a matrix operating unit 432 and a flicker component converting unit 433. The matrix generating unit 431 generates a matrix which will be described below from the inputted flicker ratio 411, and the matrix operating unit 432 performs operation on the matrix. By performing operation on the matrix, the first flicker component 381 is generated.

The first flicker component 381 from the matrix operating unit 432 is also supplied to the flicker component converting unit 433. The flicker component converting unit 433 generates the second flicker component 382 from the supplied first flicker component 381.

In this embodiment, one flicker component is generated from the other flicker component. While, here, description will be continued assuming that the second flicker component 382 included in the second exposure image 142 obtained upon long-period exposure (second exposure conditions) is generated from the first flicker component 381 obtained from the first exposure image 141 obtained upon short-period exposure (first exposure conditions), it is also possible to employ a configuration where the first flicker component 381 is generated from the second flicker component 382.

It is possible to apply operation disclosed in Patent Application No. 2012-90897 filed before the present application by the applicant of the present application, or the like, as operation for obtaining one flicker component from the other flicker component as described above. Patent Application No. 2012-90897 describes that a flicker component $g_t(y+t_2, E_2)$ upon long-period exposure (second exposure conditions) can be expressed using a linear sum of a flicker component $g_t(y+t_2, E_2)$ upon short-period exposure (first exposure conditions).

That is, the flicker component can be expressed as the following formula (11) when expressed using a vector.

[Math. 7]

$$\begin{bmatrix} g_t(t_2+0, E_2) \\ \vdots \\ g_t(t_2+N-1, E_2) \end{bmatrix} = t \begin{bmatrix} g_t(t_1+0, E_1) \\ \vdots \\ g_t(t_1+N-1, E_1) \end{bmatrix} \quad (11)$$

In formula (11), a matrix t is operation in Patent Application No. 2012-90897, which is expressed as a matrix. For simplification, formula (11) is expressed as follows. In formula (12), $g_1$ indicates the first flicker component 381, and $g_2$ indicates the second flicker component 382.

$$g_2 = tg_1 \quad (12)$$

The above-described formula (10) can be expressed as follows using formula (11) and formula (12).

[Math. 8]

$$r_{12}(y) \times g_t(y+t_2, E_2) = \quad (13)$$

$$g_t(y+t_1, E_1) \leftrightarrow \begin{bmatrix} r_{12}(0) & & & 0 \\ & r_{12}(1) & & \\ & & \ddots & \\ 0 & & & r_{12}(N-1) \end{bmatrix} g_2 =$$

$$g_1 \leftrightarrow rg_2 = g_1$$

In formula (13), a matrix r can be measured from an image and a matrix t can be obtained from mutual relationship between the first exposure conditions and the second exposure conditions. Therefore, the first flicker component 381 and the second flicker component 382 are obtained from the following two formulas. A formula described in an upper part of the following formula (14) is formula (12), and a formula described in a lower part is formula (13).

$$g_2 = tg_1$$

$$rg_2 = g_1 \quad (14)$$

As solution 1, flicker components $g_1$ and $g_2$ are obtained by utilizing that the following formula (15) can be derived from formula (14).

$$rtg_1 = g_1 \quad (15)$$

If an eigenvector of an eigenvalue 1 of a matrix rt is obtained from formula (15), it is possible to obtain the flicker component $g_1$ (first flicker component 381) under the first exposure conditions (short-period exposure). Typically, while the eigenvector has arbitrary property of a constant factor, because an average value of the flicker components is approximately 1, it is possible to uniquely obtain the first flicker component 381. If the first flicker component 381 can be obtained, it is possible to obtain the second flicker component 382 from the first flicker component 381 (for example, a technique disclosed in Patent Application No. 2012-98097 can be applied).

As solution 2, formula (14) is expressed as one matrix as in the following formula (16).

[Math. 9]

$$\begin{bmatrix} t & -I \\ I & -r \end{bmatrix} \begin{bmatrix} g_1 \\ g_2 \end{bmatrix} = 0 \quad (16)$$

It is only necessary to obtain the first flicker component 381 and the second flicker component 382 which satisfy formula (16) using least-squares estimation. In formula (16), t is a coefficient used for converting a flicker component upon short-period exposure into a flicker component upon long-period exposure, and r is a flicker ratio expressed with formula (9), and can be obtained from an image.

I, which is a pixel value, can be obtained from an image. Therefore, a numerical value within the first term in formula (16) is a value which can be obtained from an image, or the like. It can be seen from this that the first flicker component 381 and the second flicker component 382 can be obtained from formula (16) using least-squares estimation.

It is possible to respectively obtain the first flicker component 381 and the second flicker component 382 by applying either solution 1 or solution 2.

If solution 1 is applied, the matrix generating unit 431 of the estimation operating unit 404 illustrated in FIG. 20 generates the matrix rt expressed with formula (15), and the matrix operating unit 432 performs matrix operation using the generated matrix rt and generates the flicker component $g_1$ (first flicker component 381).

Specifically, the matrix operating unit 432 obtains the eigenvector of the eigenvalue 1 of the matrix rt. The obtained eigenvector becomes the first flicker component 381. It should be noted that an average value of the eigenvector is limited to be 1. The flicker component converting unit 433 generates the second flicker component 382 from the first flicker component 381 based on relational expression of $g_2=tg_1$ expressed with formula (14).

If solution 2 is applied, the matrix generating unit 431 generates the matrix expressed with formula (16), and the matrix operating unit 432 performs operation on the matrix. The first flicker component 381 is generated through the operation by the matrix operating unit 432, and the second flicker component 382 is generated by the flicker component converting unit 433. For example, the matrix operating unit 432 can be configured to obtain a predetermined function using least-squares method to calculate the first flicker component 381, and the flicker component converting unit 433 can be configured to calculate the second flicker component 382 from the predetermined function and the first flicker component 381.

It should be noted that while FIG. 20 illustrates the matrix operating unit 432 and the flicker component converting unit 433 as different blocks, the matrix operating unit 432 and the flicker component converting unit 433 may be the same block. In other words, in order to clearly illustrate that after one flicker component is calculated, the other flicker component is calculated, the matrix operating unit 432 and the flicker component converting unit 433 are separately illustrated and described.

However, it is also possible to employ a configuration where the matrix operating unit 432 and the flicker component converting unit 433 are configured as one block, one flicker component is generated and the other flicker component is generated from the flicker component within the block, and the first flicker component 381 and the second flicker component 382 are finally outputted from the block.

In this manner, it is possible to apply solution in real space to calculate respective flicker components of two images under different exposure conditions. Therefore, it is possible to correct the respective flicker components of the two images under different exposure conditions and generate one high dynamic range image from the two image for which the flicker components are corrected.

<Second Embodiment of Flicker Suppression>

Figure 21:
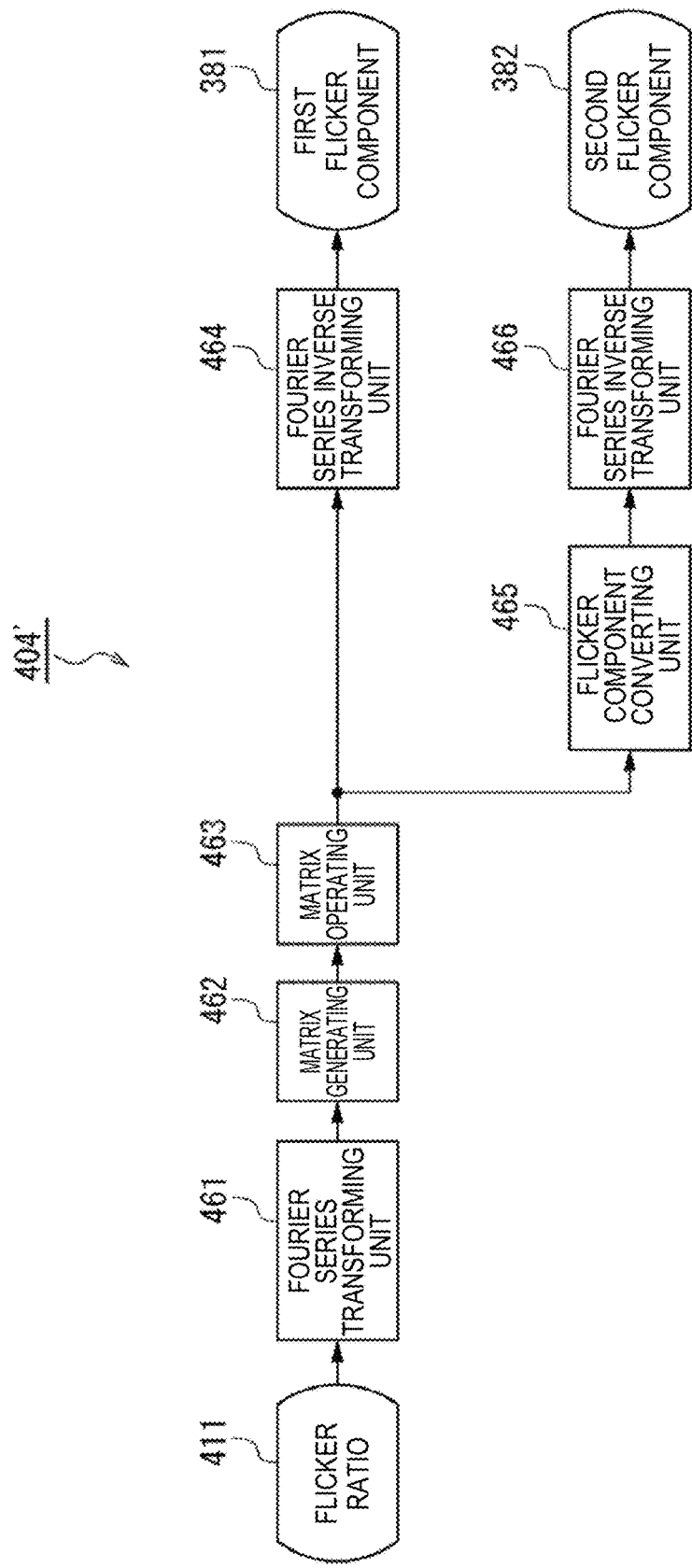
FIG. 21 is a diagram for explaining another configuration of the estimation operating unit.

Next, as the second embodiment, a case will be described where flicker components are obtained using solution in complex space. FIG. 21 is a diagram illustrating an internal configuration example of an estimation operating unit 404' of the flicker estimating unit 371 within the flicker correcting unit 312 in the second embodiment. It should be noted that, here, in order to differentiate the estimation operating unit 404' from the estimation operating unit 404 in the first embodiment illustrated in FIG. 20, the estimation operating unit 404' in the second embodiment will be described with a dash mark being added.

The estimation operating unit 404' illustrated in FIG. 21 is configured to include a Fourier series transforming unit 461, a matrix generating unit 462, a matrix operating unit 463, a Fourier series inverse transforming unit 464, a flicker component converting unit 465 and a Fourier series inverse transforming unit 466.

The flicker ratio 411 is supplied to the Fourier series transforming unit 461 of the estimation operating unit 404'. The Fourier series transforming unit 461 performs Fourier series expansion on the supplied flicker ratio 411. A reference frequency of the Fourier series of the Fourier series transforming unit 461 can be made the same as a frequency of the flicker.

For example, when flicker is caused by a fluorescent light, or the like, the reference frequency of the Fourier series of the Fourier series transforming unit 461 is set at 100 Hz or 120 Hz. Further, when it is intended to remove cyclic noise, a frequency appropriate for a cycle of the noise is set as the reference frequency of the Fourier series.

The matrix generating unit 462 obtains a matrix RT which will be described later. The matrix operating unit 463 obtains an eigenvector of an eigenvalue 1 of the matrix RT generated at the matrix generating unit 462 under the conditions that $G_1(0)=1$ and

[Math. 10]

$$\overline{G_1(\omega)} \text{ and } G_1(\omega)$$

become a complex conjugate.

The value calculated at the matrix operating unit 463 is a value obtained by performing Fourier series expansion on the first flicker component 381. By performing Fourier series inverse transform on this value at the Fourier series inverse transforming unit 464, the first flicker component 381 can be obtained.

A value obtained by performing Fourier series expansion on the first flicker component 381 is also supplied to the flicker component converting unit 465 from the matrix operating unit 463. The flicker component converting unit 465 generates a value obtained by converting the second flicker component 382 in Fourier series by multiplying a conversion coefficient $T_{12}(\omega)$ by a value obtained by performing Fourier series expansion on the first flicker component.

The value converted at the flicker component converting unit 465 is supplied to the Fourier series inverse transforming unit 466, where the value is subjected to Fourier series inverse transform to be made the second flicker component 382.

In this manner, by obtaining solution in frequency space (complex space), it is possible to obtain a flicker component with less operation. This operation will be further described.

As described above, the following relational expression (10) holds between the flicker ratio and the flicker components.

$$r_{12}(y) \times g_r(y+t_2, E_2) = g_1(y+t_1, E_1) \quad (10)$$

When Fourier transform is performed on both sides of this formula (10), because multiplication becomes convolution operation, the following formula (17) can be obtained. It should be noted that, here, basically, symbols in real space are expressed using small letters, while symbols in frequency space are expressed using capital letters.

[Math. 11]

$$R_{12}(\omega) \otimes G_2(\omega) = G_1(\omega) \quad (17)$$

In formula (17), $G_1(\omega)$ indicates a value obtained by performing Fourier transform on the first flicker component 381, while $G_2(\omega)$ indicates a value obtained by performing Fourier transform on the second flicker component 382. Further, as will be described later, $G_1(\omega)$ and $G_2(\omega)$ are expressed using a value $T_{12}(\omega)$ obtained from the first exposure conditions and the second exposure conditions as in the following formula (18).

[Math. 12]

$$G_2(\omega) = T_{12}(\omega) \times G_1(\omega) \quad (18)$$

The following formula (19) can be obtained from formula (17) and formula (18).

[Math. 13]

$$R_{12}(\omega) \otimes T_{12}(\omega) \times G_1(\omega) = G_1(\omega) \quad (19)$$

Further, when formula (19) is expressed with a matrix, because convolution operation becomes a cyclic matrix, formula (19) can be expressed with the following formula (20).

[Math. 14]

$$\begin{bmatrix} R_0 & \overline{R_1} & \cdots & \overline{R_M} & & & 0 \\ R_1 & R_0 & \ddots & \ddots & \ddots & & \\ \vdots & \ddots & R_0 & \overline{R_1} & \ddots & \ddots & \\ R_M & \ddots & \ddots & R_0 & \ddots & \ddots & \overline{R_M} \\ & \ddots & \ddots & R_1 & R_0 & \ddots & \vdots \\ & & \ddots & \ddots & \ddots & R_0 & \overline{R_1} \\ 0 & & & R_M & \cdots & R_1 & R_0 \end{bmatrix} \begin{bmatrix} \overline{T_M} & & & \\ & \ddots & & 0 \\ & & \overline{T_1} & & \\ & & & T_0 & \\ & & & & T_1 & \\ & 0 & & & & \ddots \\ & & & & & & T_M \end{bmatrix} \begin{bmatrix} \overline{G_1(M)} \\ \vdots \\ \overline{G_1(1)} \\ G_1(0) \\ G_1(1) \\ \vdots \\ G_1(M) \end{bmatrix} = \begin{bmatrix} \overline{G_1(M)} \\ \vdots \\ \overline{G_1(1)} \\ G_1(0) \\ G_1(1) \\ \vdots \\ G_1(M) \end{bmatrix} \quad (20)$$

In formula (12), $R_{12}(\omega)$ and $T_{12}(\omega)$ are respectively abbreviated as $R_\omega$ and $T_\omega$. Further, because a value of a negative frequency becomes a complex conjugate of a value of a positive frequency, the value of the negative frequency is expressed as follows.

[Math. 15]

$$G_1(-\omega) = \overline{G_1(\omega)}$$

Formula (19) or formula (20) is expressed as in the following formula (21).

$$RTG_1 = G_1 \quad (21)$$

It is only necessary to obtain the eigenvector of the eigenvalue 1 of the matrix RT under the conditions that

[Math. 16]

$$\overline{G_1(\omega)} \text{ and } G_1(\omega)$$

become a complex conjugate.

However, typically, an eigenvector can be the same eigenvector even if the eigenvector is multiplied by an arbitrary constant. However, because the average value of the flicker components is 1, and $$G_1(0) = 1,$$

and is known, it is possible to uniquely obtain solution.

Further, a method for estimating the first flicker component 381 and the second flicker component 382 in complex space will be further described.

The flicker component can be expressed as in the following formula (22).

[Math. 17]

$$g(t, E) = \frac{F_A(t, E)}{F_D(t, E)} \quad (22)$$

$$= \frac{\int_{t-E}^{t} f(\tau) d\tau}{\int_{t-E}^{t} f_D d\tau}$$

$$= \frac{1}{E} \int_{t-E}^{t} \frac{f(\tau)}{f_d} d\tau$$

$$= \frac{1}{E} \int_{t-E}^{t} f'(\tau) d\tau$$

Formula (22) can be expressed as in the following formula (23) using convolution operation of fluctuation of a light source and a shutter function.

[Math. 18]

$$g(t, E) = f'(t) \otimes s(t, E) \quad (23)$$

$$\begin{cases} f'(t) = \dfrac{f(t)}{f_D} \\ s(t, E) = \dfrac{1}{E} rect\left(\dfrac{1}{E} - \dfrac{1}{2}\right) \end{cases}$$

Figure 22:
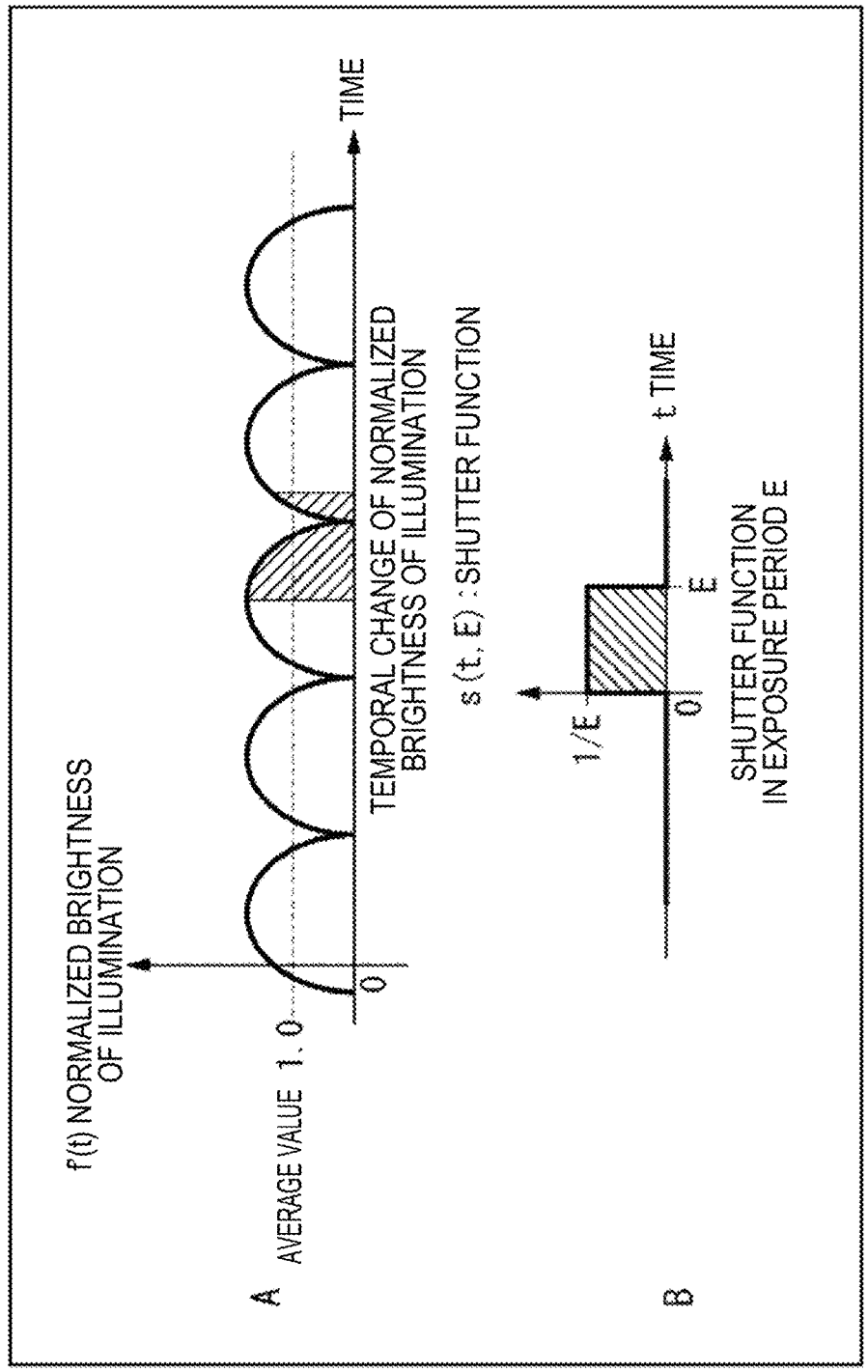
FIG. 22 is a diagram for explaining a shutter function.

In formula (23), f'(t) is a value obtained by normalizing fluctuation of the light source f(t) so that an average value becomes 1 as illustrated in part A in FIG. 22. Further, in formula (23), a shutter function s(t, E) is a function as indicated in part B in FIG. 22. The function indicated in part B in FIG. 22 is a function having a value of 1/E while time is from 0 to E and having a value of 0 in other time.

Operation is performed after the flicker component is converted in frequency space. When gt(t, E) is expressed in frequency space, because convolution operation becomes multiplication, the following formula (24) can be obtained.

[Math. 19]

$$G(\omega, E) = F'(\omega) \times S(\omega, E) \quad (24)$$

Further, when the flicker component under the first exposure conditions and the flicker component under the second exposure conditions expressed in frequency space are respectively defined as $G_1(\omega)$ and $G_2(\omega)$, $G_1(\omega)$ and $G_2(\omega)$ can be respectively expressed as in the following formula (25).

[Math. 20]

$$\begin{cases} G_1(\omega) = F'(\omega) \times S(\omega, E_1) \times \exp(2\pi i \omega t_1) \\ G_2(\omega) = F'(\omega) \times S(\omega, E_2) \times \exp(2\pi i \omega t_2) \end{cases} \quad (25)$$

$G_2(\omega)$ can be expressed as in the following formula (26) from formula (25) using $G_1(\omega)$.

[Math. 21]

$$G_2(\omega) = T_{12}(\omega) \times G_1(\omega) \quad (26)$$

$$\text{where } T_{12}(\omega) = \dfrac{S(\omega, E_2)}{S(\omega, E_1)} \exp\{i\omega(t_2 - t_1)\}$$

In formula (26), s(ω, E) is a shutter function s(t, E) expressed in frequency space, and can be expressed as in the following formula (27).

[Math. 22]

$$s(t, E) = \dfrac{1}{E} rect\left(\dfrac{t}{E} - \dfrac{1}{2}\right) \quad (27)$$

$$S(\omega, E) = \dfrac{1}{E} \cdot \text{sinc}(E\omega) \exp\left(-2\pi i \omega \times \dfrac{1}{2}E\right) = \text{sinc}(E\omega)\exp(-\pi i \omega E)$$

As can be seen from formula (26), a value ($G_2(\omega)$) obtained by performing Fourier series expansion on the second flicker component 382 can be calculated from a value ($G_1(\omega)$) obtained by performing Fourier series expansion on the first flicker component 381. By operation based on formula (26) being performed at the flicker component converting unit 465 (FIG. 21), a value obtained by performing Fourier series expansion on the second flicker component 382 is calculated.

Further, the matrix generating unit 462 generates the matrix RT in formula (20) and formula (21), and the matrix operating unit 462 calculates the eigenvector of the eigenvalue 1 of the matrix RT. Because this calculated eigenvector is a value obtained by performing Fourier series expansion on the first flicker component 381, by the Fourier series inverse transform being performed at the Fourier series inverse transforming unit 464, the first flicker component 381 is calculated.

On the other hand, as described above, the flicker component converting unit 465 performs operation based on formula (26) to thereby convert the first flicker component 381 into the second flicker component 382. Because this converted value is a value obtained by performing Fourier series expansion on the second flicker component 382, by Fourier series inverse transform being performed at the Fourier series inverse transforming unit 466, the second flicker component 382 is calculated.

By applying solution in complex space in this manner, it is possible to calculate respective flicker components of two images under different exposure conditions. Therefore, it is possible to correct the respective flicker components of the two images under different exposure conditions and generate one high dynamic range image from the two images for which the flicker components are corrected.

<Third Embodiment of Flicker Suppression>

In the first embodiment and the second embodiment, description has been provided using a case as an example where the flicker components are suppressed by calculating the first flicker component 381 and the second flicker component 382 using the flicker ratio between the flicker component of the image picked up while being exposed under the first exposure conditions and the flicker component of the image picked up while being exposed under the second exposure conditions.

Next, as the third embodiment, a case will be described as an example where the first flicker component 381 and the second flicker component 382 are calculated without using the flicker ratio.

Figure 23:
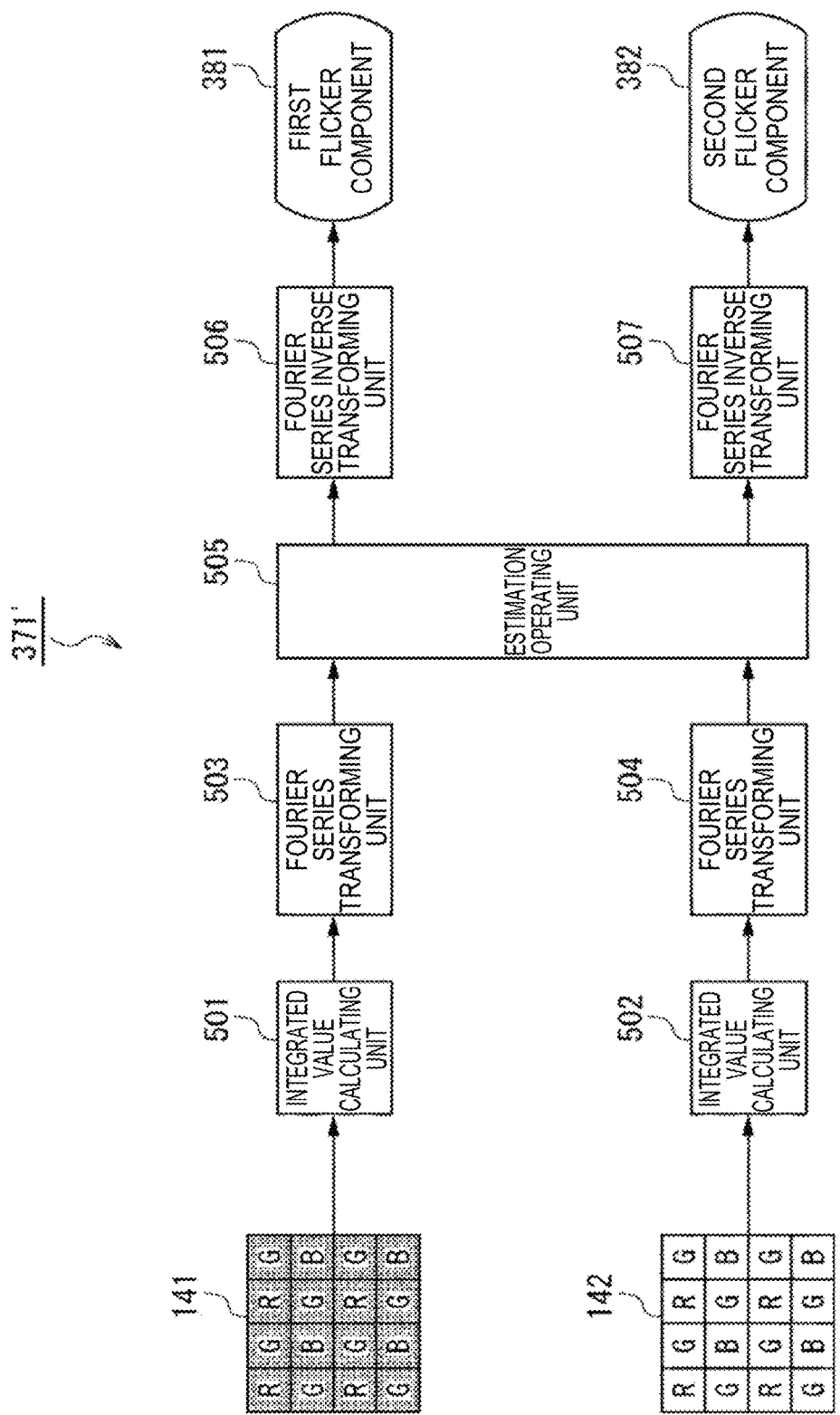
FIG. 23 is a diagram for explaining another configuration of the flicker estimating unit.

FIG. 23 is a diagram illustrating a configuration of a flicker estimating unit 371'. In order to differentiate the flicker estimating unit 371' from the flicker estimating unit 371 illustrated in FIG. 18, the flicker estimating unit 371' illustrated in FIG. 23 will be described with a dash mark being added. Further, the flicker estimating unit 371' illustrated in FIG. 23 is the flicker estimating unit 371 which configures the flicker correcting unit 312 illustrated in FIG. 17.

The flicker estimating unit 371' illustrated in FIG. 23 is configured with an integrated value calculating unit 501, an integrated value calculating unit 502, a Fourier series transforming unit 503, a Fourier series transforming unit 504, an estimation operating unit 505, a Fourier series inverse transforming unit 506 and a Fourier series inverse transforming unit 507.

The first exposure image 141 is supplied to the integrated value calculating unit 501, and the second exposure image 142 is supplied to the integrated value calculating unit 502.

The integrated value calculating unit 501 integrates the first exposure image 141 in a horizontal direction and outputs the integrated value to the Fourier series transforming unit 503. In a similar manner, the integrated value calculating unit 502 integrates the second exposure image 142 in a horizontal direction and outputs the integrated value to the Fourier series transforming unit 504.

While the integrated value calculating unit 501 and the integrated value calculating unit 502 respectively calculate the integrated values of the first exposure image 141 and the second exposure image, the integrated value calculating unit 501 and the integrated value calculating unit 502 may perform processing while targeting at all the pixels or may perform processing while targeting at pixels within a predetermined area.

Further, integration operation may not be used for pixels at positions where pixels of either the first exposure image 141 or the second exposure image 142 are saturated. For example, a portion which does not include halation, a black defect, a subject portion, or the like, can be set as a portion to be used for integration.

The Fourier series transforming unit 503 performs Fourier series expansion by multiplying the integrated value of the first exposure image 141 by an appropriate window function and obtains frequency inscription $J_1(\omega)$ (which will be described later in details) of the first exposure image 141. In a similar manner, the Fourier series transforming unit 504 performs Fourier series expansion by multiplying the integrated value of the second exposure image 142 by an appropriate window function and obtains frequency inscription $J_2(\omega)$ of the second exposure image 142. It should be noted that the window function is typically used in Fourier transform, or the like, and, for example, a hann window can be used.

To the estimation operating unit 505, the frequency inscription $J_1(\omega)$ of the first exposure image 141 is supplied from the Fourier series transforming unit 503, and the frequency inscription $J_2(\omega)$ of the second exposure image 142 is supplied from the Fourier series transforming unit 504. The estimation operating unit 505 generates a matrix Q and obtains a fluctuation component F' of the light source. Further, the estimation operating unit 505 obtains a value obtained by performing Fourier series expansion on the first flicker component 381 and a value obtained by performing Fourier series expansion on the second flicker component 382.

The value obtained by performing Fourier series expansion on the first flicker component 381 obtained at the estimation operating unit 505 is supplied to the Fourier series inverse transforming unit 506, where the value is subjected to Fourier series inverse transform to be made the first flicker component 381. In a similar manner, the value obtained by performing Fourier series expansion on the second flicker component 382 obtained at the estimation operating unit 505 is supplied to the Fourier series inverse transforming unit 507, where the value is subjected to Fourier series inverse transform to be made the second flicker component 382.

Also in the third embodiment, as in the second embodiment, by obtaining solution in frequency space (complex space), it is possible to obtain flicker components with less operation. This operation will be further described.

Figure 24:
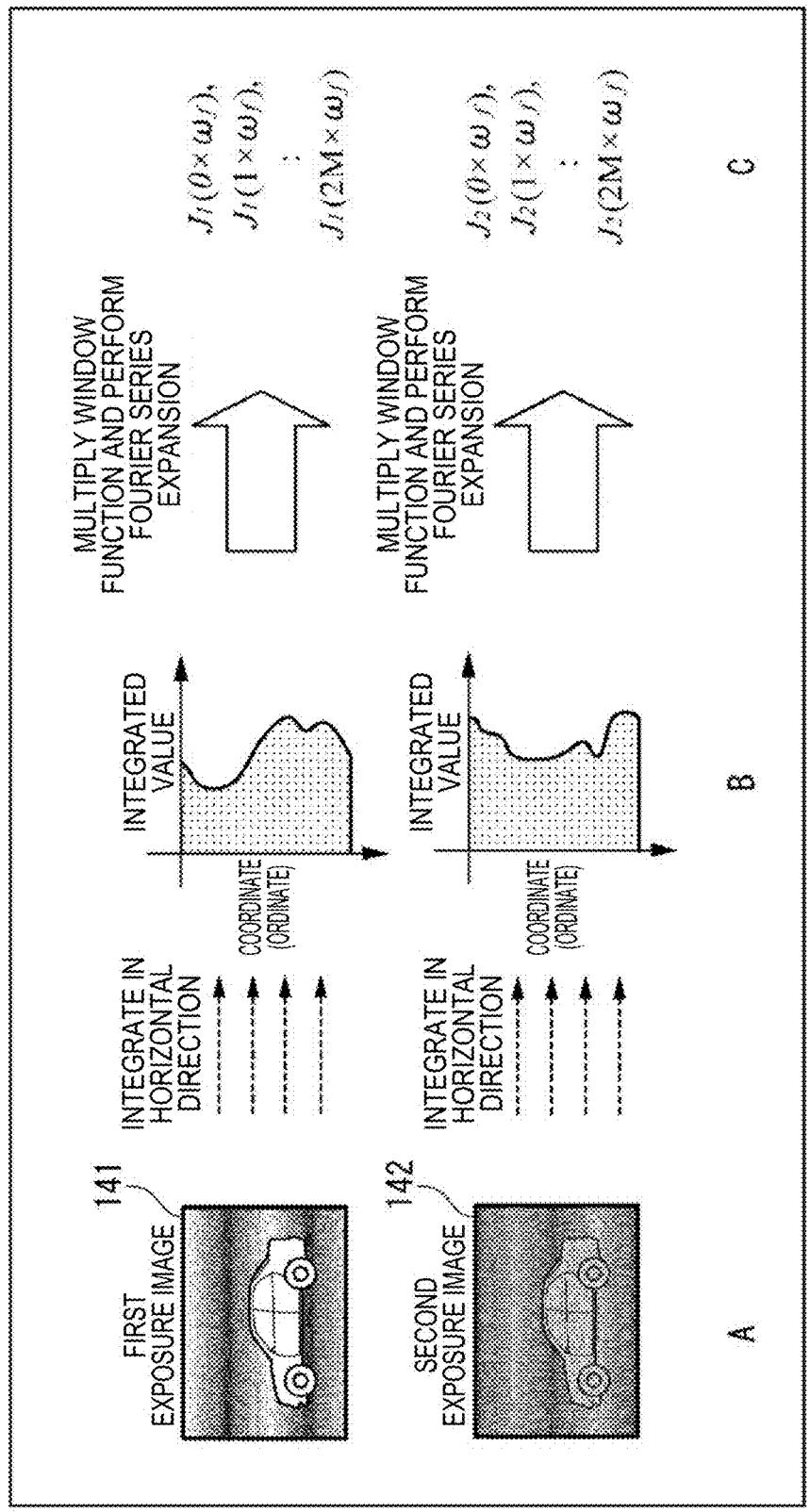
FIG. 24 is a diagram for explaining calculation of a flicker component in frequency space.

FIG. 24 illustrates processing of the integrated value calculating units 501 and 502, and the Fourier series transforming units 503 and 504, and illustrates process of obtaining $J_1(\omega)$ and $J_2(\omega)$ in frequency space of images under respective exposure conditions. Part A in FIG. 24 illustrates the first exposure image 141 and the second exposure image 142 and illustrates an example where the images include stripe patterns due to influence of flicker.

One example of a result in the case where an effective portion of the first exposure image 141 is integrated in a horizontal direction will be illustrated in an upper part of part B in FIG. 24. Further, one example of a result in the case where an effective portion of the second exposure image 142 is integrated in a horizontal direction will be illustrated in a lower part of part B in FIG. 24. Effective portions used for integration are portions which do not include halation, a black defect, a subject portion, or the like.

The calculated integrated value is multiplied by an appropriate window function, and subjected to Fourier series expansion. As Fourier series, values of frequencies from $0 \times \omega k$ to $2M \times \omega k$ are calculated. As a result, the frequency inscription $J_1(\omega)$ of the first exposure image 141 and the frequency inscription $J_2(\omega)$ of the second exposure image 142 are respectively obtained (part C in FIG. 24).

Such operation will be further described. The first exposure image 141 picked up under the first exposure conditions and the second exposure image 142 picked up under the second exposure conditions are respectively expressed as follows.

$$I_1(x,y)=I_0(x,y) \times E_1 \times g_t(t_1+y,E_1)$$

$$I_2(x,y)=I_0(x,y) \times E_2 \times g_t(t_2+y,E_2) \qquad (28)$$

From formula (28), the following formula (29) holds.

$$I_1(x,y) \times E_2 \times g_t(t_2-y,E_2) - I_2(x,y) \times E_1 \times g_t(t_1+y,E_1) = 0 \qquad (29)$$

Formula (29) is expressed as the following formula (30) when expressed in frequency space.

[Math. 23]

$$E_2 J_1(\omega) \otimes G_2(\omega) - E_1 J_2(\omega) \otimes G_1(\omega) = 0 \qquad (30)$$

In formula (30), $J_1(\omega)$ is a value obtained by integrating $I_1(x, y)$ in a horizontal direction, that is, a value expressing a value obtained by integrating the first exposure image 141 in a horizontal direction in frequency space. In a similar manner, $J_2(\omega)$ is a value obtained by integrating $I_2(x, y)$ in a horizontal direction, that is, a value expressing a value obtained by integrating the second exposure image 142 in a horizontal direction in frequency space.

When the flicker component $G_1(\omega)$ and the flicker component $G_2(\omega)$ are assigned in formula (30), the following formula (31) is obtained. [Math. 24]

$$E_2 J_1(\omega) \otimes \{S(\omega,E_2) \times \exp(2\pi\omega t_2) \times F'(\omega)\} - E_1 J_2(\omega) \otimes \{S(\omega,E_1) \times \exp(2\pi\omega t_1) \times F'(\omega)\} = 0 \qquad (31)$$

Formula (31) is a linear formula and can be expressed as in the following formula (32) as a matrix.

$$E_2 J_1 S_2 P_2 F' - E_1 J_2 S_1 P_1 F' = 0$$

$$(E_2 J_1 S_2 P_2 - E_1 J_2 S_1 P_1) F' = 0 \qquad (32)$$

$J_1$, $S_1$, $P_1$ and F' in formula (32) are matrices respectively expressed in the following formula (33) to formula (36). It should be noted that because $J_2$, $S_2$ and $P_2$ can be expressed in a similar manner, expression will be omitted here.

[Math. 25]

$$J_1 = \begin{bmatrix} J_1(0 \times \omega_f) & \ddots & \ddots & \overline{J_1(M \times \omega_f)} & \ddots & \ddots & \overline{J_1(2M \times \omega_f)} \\ J_1(1 \times \omega_f) & \ddots & \ddots & & \ddots & \ddots & \ddots \\ \ddots & \ddots & \ddots & \overline{J_1(1 \times \omega_f)} & \ddots & \ddots & \ddots \\ \ddots & \ddots & \ddots & J_1(0 \times \omega_f) & \ddots & \ddots & \ddots \\ \ddots & \ddots & \ddots & J_1(1 \times \omega_f) & \ddots & \ddots & \ddots \\ \ddots & \ddots & \ddots & \ddots & \ddots & \ddots & \overline{J_1(1 \times \omega_f)} \\ J_1(2M \times \omega_f) & \ddots & \ddots & J_1(M \times \omega_f) & \ddots & \ddots & J_1(0 \times \omega_f) \end{bmatrix} \quad (33)$$

[Math. 26]

$$S_1 = \begin{bmatrix} \overline{S(M \times \omega_k, E_1)} & & & & & & 0 \\ & \ddots & & & & & \\ & & \overline{S(1 \times \omega_k, E_1)} & & & & \\ & & & S(0 \times \omega_k, E_1) & & & \\ & & & & S(1 \times \omega_k, E_1) & & \\ & 0 & & & & \ddots & \\ & & & & & & S(M \times \omega_k, E_1) \end{bmatrix} \quad (34)$$

[Math. 27]

$$P_1 = \begin{bmatrix} \exp(-M \times 2\pi\omega_f t_1) & & & & & & 0 \\ & \ddots & & & & & \\ & & \exp(-1 \times 2\pi\omega_f t_1) & & & & \\ & & & \exp(0 \times 2\pi\omega_f t_1) & & & \\ & & & & \exp(1 \times 2\pi\omega_f t_1) & & \\ & 0 & & & & \ddots & \\ & & & & & & \exp(M \times 2\pi\omega_f t_1) \end{bmatrix} \quad (35)$$

[Math. 28]

$$F = \begin{bmatrix} \overline{F'(M \times \omega_f)} \\ \vdots \\ \overline{F'(1 \times \omega_f)} \\ F'(0 \times \omega_f) \\ F'(1 \times \omega_f) \\ \vdots \\ F'(M \times \omega_f) \end{bmatrix} \quad (36)$$

In formula (33) to formula (36), $\omega_f$ is a fundamental frequency of flicker, and, normally, is a value corresponding to 100 Hz or 120 Hz. When noise in a predetermined cycle is removed, $\omega_f$ is made a frequency corresponding to the cycle. Further, it is assumed that a waveform of the light source includes a frequency of up to M times of the fundamental frequency $\omega_f$. In the case of a typical light source, M is 1. Further, there is a case where M is greater than 1 according to light sources because some light sources have high-frequency time varying components.

Here, formula (32) is expressed as in the following formula (33).

$$QF'=0$$

$$Q=E_2 J_1 S_2 P_2 - E_1 J_2 S_1 P_1 \quad (37)$$

In Q in formula (37), E indicates an exposure period, and J indicates an exposure image expressed in frequency space after being integrated in a horizontal direction. Further, S indicates a shutter function expressed on frequency space and the shutter function expressed on frequency space described with reference to FIG. 22. Further, P is $\exp(2\pi\omega t)$. Because these values are obtained from the exposure image and the exposure period, Q is known.

Because Q is known, F' can be obtained from formula (37). When F' is obtained, a flicker component can be obtained from the following formula (38).

[Math. 29]

$$\begin{cases} G_1(\omega) = F'(\omega) \times S(\omega, E_1) \times \exp(2\pi i \omega t_1) \\ G_2(\omega) = F'(\omega) \times S(\omega, E_2) \times \exp(2\pi i \omega t_2) \end{cases} \quad (38)$$

$G_1(\omega)$ in formula (38) is the first flicker component 381 of the first exposure image 141 picked up under the first exposure conditions, expressed in frequency space, and $G_2(\omega)$ is the second flicker component 382 of the second exposure image 142 picked up under the second exposure conditions, expressed in frequency space.

By respectively converting the flicker component 381 and the second flicker component 382 in frequency space obtained using formula (38) into flicker components in real space, the first flicker component 381 and the second flicker component 382 can be respectively obtained.

The estimation operating unit 505 (FIG. 23) of the flicker estimating unit 371' generates a matrix Q in formula (37) and obtains a fluctuation component F' of the light source. Then, the estimation operating unit 505 performs operation based on formula (38) to generate a flicker component in frequency space.

In this manner, it is possible to calculate respective flicker components of two images under different exposure conditions by applying solution in complex space without using a flicker ratio. Therefore, it is possible to correct the respective flicker components of the two images under different exposure conditions and generate one high dynamic range image from the two images for which the flicker components are corrected.

While, in the above-described embodiments, when one image is picked up, as described above, a case has been described as an example where an image is picked up using short-period exposure (first exposure conditions) and long-period exposure (second exposure conditions) at the same time, the present technology can be also applied to a case where an image upon short-period exposure and an image upon long-period exposure are acquired by alternately picking up a short-period exposure image and a long-period exposure image with normal pixels without separating pixels for short-period exposure from pixels for long-period exposure.

In this case, because imaging timings are different, the present technology can be applied by using a matrix which takes into account the imaging timings as a matrix to be used for operation upon the above-described flicker correction.

Further, while, in the above-described examples, the imaging apparatus which picks up images with two types of exposure periods of short-period exposure and long-period exposure has been described, the present technology can be also applied to an imaging apparatus in which picked up images with three or more types of exposure periods are combined.

When picked up images with three or more types of exposure periods are combined, for example, it is possible to estimate the first flicker component from the first exposure image and the second exposure image, and convert the first flicker component into the third flicker component to estimate the third flicker component. Further, it is also possible to obtain solution by generating a matrix in which all the first exposure image, the second exposure image and the third exposure image are combined.

Further, while, in the above-described embodiments, a case has been described as an example where the flicker components are obtained using exposure images respectively picked up with two different types of exposure periods, the present technology can be also applied to a case where the flicker components are obtained using an exposure image picked up with one type of an exposure period.

To obtain the flicker components using the exposure image picked up with one type of an exposure period, an image in the first frame is used as an exposure image picked up under the first exposure conditions in the above-described embodiments, and an image in the second frame is used as an exposure image picked up under the second exposure conditions in the above-described embodiments.

It should be noted that, in this case, because there is a possibility that the flicker components cannot be obtained under conditions where a speed interval of imaging is the integral multiple of a cycle of the flicker, for example, the flicker components may be obtained using three frames by picking up three frames, and making an imaging interval between the first frame and the second frame different from an imaging interval between the second frame and the third frame.

<Recording Medium>

The above-described series of processing can be executed with hardware or can be executed with software. If the series of processing are executed with software, a program constituting software is installed in a computer. Here, the computer includes a computer incorporated into dedicated hardware, and, for example, a general-purpose personal computer which can execute various kinds of functions by various kinds of programs being installed.

Figure 25:
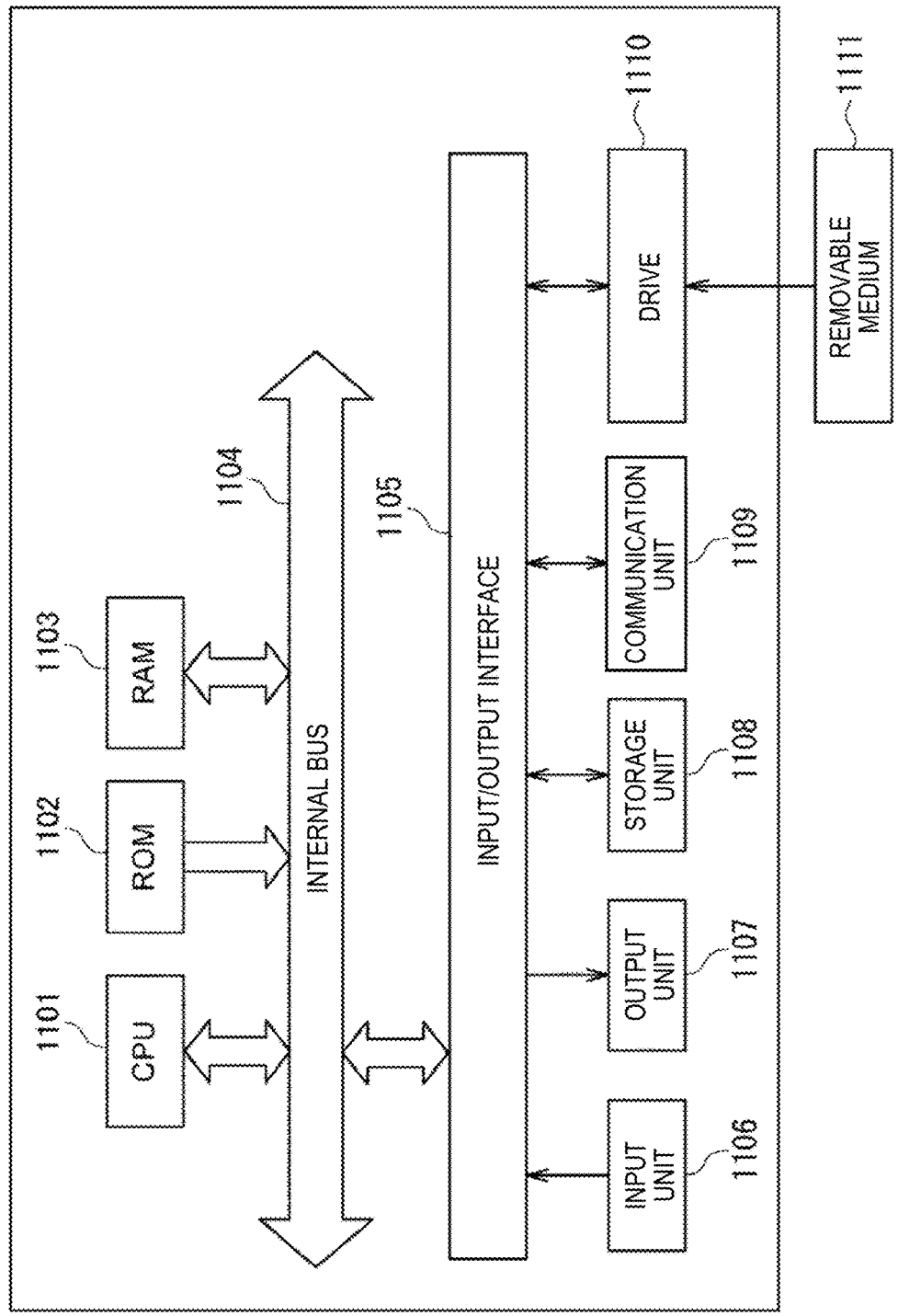
FIG. 25 is a diagram for explaining a recording medium.

FIG. 25 is a block diagram illustrating a configuration example of hardware of a computer which executes the above-described series of processing using a program. In the computer, a central processing unit (CPU) 1101, a read only memory (ROM) 1102 and a random access memory (RAM) 1103 are connected to one another via a bus 1104. An input/output interface 1105 is further connected to the bus 1104. An input unit 1106, an output unit 1107, a storage unit 1108, a communication unit 1109 and a drive 1110 are connected to the input/output interface 1105.

The input unit 1106 is formed with a keyboard, a mouse, a microphone, or the like. The output unit 1107 is formed with a display, a speaker, or the like. The storage unit 1108 is formed with a hard disc, a non-volatile memory, or the like. The communication unit 1109 is formed with a network interface, or the like. The drive 1110 drives removable medium 1111 such as a magnetic disc, an optical disc, a magnetooptical disc and a semiconductor memory.

In the computer configured as described above, the above-described series of processing are executed by, for example, the CPU 1101 loading a program stored in the storage unit 1108 to the RAM 1103 via the input/output interface 1105 and the bus 1104 and executing the program.

The program executed by the computer (CPU 1101) can be provided by, for example, being recorded in the removable medium 1111 as package medium. Further, the program can be provided via wired or wireless transmission medium such as a local area network, the Internet and digital satellite broadcasting.

In the computer, the program can be installed in the storage unit 1108 via the input/output interface 1105 by the removable medium 1111 being loaded to the drive 1110. Further, the program can be received at the communication unit 1109 via the wired or wireless transmission medium and installed in the storage unit 1108. In addition, the program can be installed in advance in the ROM 1102 or the storage unit 1108.

It should be noted that the program executed by the computer may be a program which causes processing to be performed in time series in the order described in the present specification or may be a program which causes processing to be performed in parallel or at a necessary timing such as upon calling.

Further, in the present specification, a system indicates the whole apparatus configured with a plurality of apparatuses.

It should be noted that the advantageous effects described in the present specification are merely examples, and may be other advantageous effects.

It should be noted that the embodiments of the present technology are not limited to the above-described embodiments, and can be modified in various manners without departing from the gist of the present technology.

Additionally, the present technology may also be configured as below.

(1)
An image processing apparatus including:
an estimating unit configured to estimate cyclic noise components included in each image picked up under different exposure conditions for each image,
wherein the estimating unit estimates the cyclic noise components for each image through operation utilizing mutual relationship between the noise components under the exposure conditions.

(2)
The image processing apparatus according to (1),
wherein the cyclic noise is flicker.

(3)
The image processing apparatus according to (1) or (2),
wherein the mutual relationship between the noise components is expressed with a shutter function of the exposure conditions in frequency space.

(4)
The image processing apparatus according to any of (1) to (3),
wherein the estimating unit estimates the noise components using a value obtained by integrating the images, multiplying a predetermined window function and performing Fourier series expansion.

(5)
The image processing apparatus according to (4),
wherein the integration is performed in a horizontal direction for a portion not saturated in any of the images.

(6)
The image processing apparatus according to any of (1) to (5),
wherein the estimating unit obtains the noise components in frequency space by obtaining a matrix Q where QF=0 when a fluctuation component of a light source is F and obtaining the fluctuation component F, and
wherein the estimating unit estimates the noise components for each image by performing Fourier series inverse transform on the noise components in the frequency space.

(7)
The image processing apparatus according to (1),
wherein the mutual relationship between the noise components is expressed with a ratio obtained by integrating the images and performing division for each row of the images.

(8)
The image processing apparatus according to (7),
wherein the integration is performed in a horizontal direction for a portion not saturated in any of the images.

(9)
The image processing apparatus according to (7),
wherein the estimating unit obtains an eigenvector of an eigenvalue 1 of a matrix RT where R is a matrix obtained by performing Fourier series expansion on the ratio and T is a matrix obtained from the exposure conditions, and sets the eigenvector as a value obtained by performing Fourier series expansion on the noise components of the images.

(10)
The image processing apparatus according to (9),
wherein the noise components of the images are calculated by performing Fourier series inverse transform on the eigenvector.

(11)
The image processing apparatus according to (10),
wherein a value obtained by performing Fourier series expansion on the noise components of an image different from an image for which the noise components have been calculated is calculated by multiplying the eigenvector by a coefficient obtained from the exposure conditions, and wherein the noise components of the images are calculated by performing Fourier series inverse transform on the value obtained by performing Fourier series expansion.

(12)
The image processing apparatus according to (7),
wherein the estimating unit generates a matrix RT in the following formula,

[Math. 1]

$$\begin{bmatrix} R_0 & \overline{R}_1 & \cdots & \overline{R}_M & & & 0 \\ R_1 & R_0 & \ddots & \ddots & \ddots & & \\ \vdots & \ddots & R_0 & \overline{R}_1 & \ddots & \ddots & \\ R_M & \ddots & \ddots & R_0 & \ddots & \ddots & \overline{R}_M \\ & \ddots & \ddots & R_1 & R_0 & \ddots & \vdots \\ & & \ddots & \ddots & \ddots & R_0 & \overline{R}_1 \\ 0 & & & R_M & \cdots & R_1 & R_0 \end{bmatrix} \begin{bmatrix} \overline{T}_M & & & & \\ & \ddots & & & 0 \\ & & \overline{T}_1 & & \\ & & & T_0 & \\ & & & & T_1 \\ & 0 & & & & \ddots \\ & & & & & & T_M \end{bmatrix}$$

$$\begin{bmatrix} \overline{G_1(M)} \\ \vdots \\ \overline{G_1(1)} \\ G_1(0) \\ G_1(1) \\ \vdots \\ G_1(M) \end{bmatrix} = \begin{bmatrix} \overline{G_1(M)} \\ \vdots \\ \overline{G_1(1)} \\ G_1(0) \\ G_1(1) \\ \vdots \\ G_1(M) \end{bmatrix}$$

where R is the ratio, T is the coefficient obtained from the exposure conditions and G is the noise components of the images, and obtains the noise components of the images.

(13)
The image processing apparatus according to (7),
wherein the estimating unit obtains an eigenvector of an eigenvalue 1 of a matrix rt where a matrix r is the ratio and a matrix t is a matrix obtained from the exposure conditions, and estimates that the eigenvector is the noise components of the images.

(14)
The image processing apparatus according to (13),
wherein the noise components of an image different from an image for which the noise components have been calculated are calculated from a linear sum of the estimated noise components.

(15)
The image processing apparatus according to (7),
wherein the estimating unit obtains the noise components for each image by obtaining $g_1$, $g_2$ which satisfy the following formula through least-squares estimation,

[Math. 2]

$$\begin{bmatrix} t & -I \\ I & -r \end{bmatrix} \begin{bmatrix} g_1 \\ g_2 \end{bmatrix} = 0$$

where r is the ratio, t is the value obtained from the exposure conditions, I is a pixel value of the images and g is the noise components.

(16)
An image processing method including:
an estimating step of estimating cyclic noise components included in each image picked up under different exposure conditions for each image, wherein the estimating step includes processing of estimating the cyclic noise components for each image through operation utilizing mutual relationship between the noise components under the exposure conditions.

(17)

A program causing a computer to execute processing including:
an estimating step of estimating cyclic noise components included in each image picked up under different exposure conditions for each image,
wherein the estimating step includes processing of estimating the cyclic noise components for each image through operation utilizing mutual relationship between the noise components under the exposure conditions.

(18)

Electronic equipment including:
a signal processing unit configured to perform signal processing on a pixel signal outputted from an imaging device,
wherein the signal processing unit includes
an estimating unit configured to estimate cyclic noise components included in each image picked up under different exposure conditions for each image, and
a correcting unit configured to perform correction to remove noise from the images using the noise components estimated at the estimating unit,
wherein the estimating unit estimates the cyclic noise components for each image through operation utilizing mutual relationship between the noise components under the exposure conditions.

REFERENCE SIGNS LIST 100 imaging apparatus
101 optical lens
102 imaging device
103 image processing unit
104 signal processing unit
105 control unit
311 sensitivity classified interpolating unit
312 flicker correcting unit
313 HDR synthesizing unit
331, 332 extracting unit
333, 334 interpolation processing unit
351, 352 exposure correcting unit
353 blend coefficient calculating unit
354 blend processing unit
371 flicker estimating unit
372 first exposure image flicker correcting unit
373 second exposure image flicker correcting unit
401, 402 integrated value calculating unit
403 dividing unit
404 estimation operating unit
431 matrix generating unit
432 matrix operating unit
433 flicker component converting unit
461 Fourier series transforming unit
462 matrix generating unit
463 matrix operating unit
464 Fourier series inverse transforming unit
465 flicker component converting unit
466 Fourier series inverse transforming unit
501, 502 integrated value calculating unit
503, 504 Fourier series transforming unit
505 estimation operating unit
506, 507 Fourier series inverse transforming unit

The invention claimed is:

1. An image processing apparatus comprising:
an image sensor configured to capture a first image having a first exposure time and a second image having a second exposure time, wherein the first exposure time is shorter than the second exposure time; and
processing circuitry configured to:
estimate first cyclic noise components included in the first image based, at least in part, on information describing a relationship between the first image and the second image;
estimate second cyclic noise components included in the second image based, at least in part, on the information describing the relationship between the first image and the second image; and
generate a high dynamic range image based on the first image, the second image, the first cyclic noise components, and the second cyclic noise components.

2. The image processing apparatus according to claim 1, wherein the first and second cyclic noise components correspond to flicker in the first image and second image, respectively.

3. The image processing apparatus according to claim 1, wherein the information describing the relationship between the first image and the second image is expressed with a shutter function of the first and second exposure times in frequency space.

4. The image processing apparatus according to claim 1, wherein the processing circuitry is configured to estimate the first and second cyclic noise components using a value obtained by integrating the first and second images, multiplying a predetermined window function and performing Fourier series expansion.

5. The image processing apparatus according to claim 4, wherein the integration is performed in a horizontal direction for a portion not saturated in any of the images.

6. The image processing apparatus according to claim 1, wherein the processing circuitry is further configured to:
obtain each of the first and second cyclic noise components in frequency space by obtaining a matrix Q where QF=0 when a fluctuation component of a light source is F and obtaining the fluctuation component F, and
further wherein the processing circuitry is configured to estimate the first and second cyclic noise components for each image by performing Fourier series inverse transform on the first and second cyclic noise components in the frequency space.

7. The image processing apparatus according to claim 1, wherein the information describing a relationship between the first image and the second image is expressed with a ratio obtained by integrating over the first and second images and performing division for each row of the first and second images.

8. The image processing apparatus according to claim 7, wherein the integration is performed in a horizontal direction for a portion not saturated in both the first image and the second image.

9. The image processing apparatus according to claim 7, wherein the processing circuitry is further configured to obtain an eigenvector of an eigenvalue 1 of a matrix RT where R is a matrix obtained by performing Fourier series expansion on the ratio and T is a matrix obtained from the first and second exposure times, and set the eigenvector as a value obtained by performing Fourier series expansion on the first and second cyclic noise components of the images.

10. The image processing apparatus according to claim 9, wherein the first and second cyclic noise components of the first and second images are calculated by performing Fourier series inverse transform on the eigenvector.

11. The image processing apparatus according to claim 10,
wherein a value obtained by performing Fourier series expansion on the noise components of an image different from an image for which cyclic noise components have been calculated is calculated by multiplying the eigenvector by a coefficient obtained from the first and second exposure times, and
wherein the respective first and second cyclic noise components of the first and second images are calculated by performing Fourier series inverse transform on the value obtained by performing Fourier series expansion.

12. The image processing apparatus according to claim 7, wherein the processing circuitry is configured to generate a matrix RT in the following formula, $$\begin{bmatrix} R_0 & \overline{R}_1 & \cdots & \overline{R}_M & & & 0 \\ R_1 & R_0 & \ddots & \ddots & \ddots & & \\ \vdots & \ddots & R_0 & \overline{R}_1 & \ddots & \ddots & \\ R_M & \ddots & \ddots & R_0 & \ddots & \ddots & \overline{R}_M \\ & \ddots & \ddots & R_1 & R_0 & \ddots & \vdots \\ & & \ddots & \ddots & \ddots & R_0 & \overline{R}_1 \\ 0 & & & R_M & \cdots & R_1 & R_0 \end{bmatrix} \begin{bmatrix} \overline{T}_M \\ \ddots \\ \overline{T}_1 \\ T_0 \\ T_1 \\ \ddots \\ T_M \end{bmatrix}$$

$$\begin{bmatrix} \overline{G_1(M)} \\ \vdots \\ \overline{G_1(1)} \\ G_1(0) \\ G_1(1) \\ \vdots \\ G_1(M) \end{bmatrix} = \begin{bmatrix} \overline{G_1(M)} \\ \vdots \\ \overline{G_1(1)} \\ G_1(0) \\ G_1(1) \\ \vdots \\ G_1(M) \end{bmatrix}$$

where R is the ratio, T is the coefficient obtained from the first and second exposure times and G is respective cyclic noise components of one of the first and second images, and obtain the cyclic noise components of the one image.

13. The image processing apparatus according to claim 7, wherein the processing circuitry is further configured to obtain an eigenvector of an eigenvalue 1 of a matrix rt, where a matrix r is the ratio and a matrix t is a matrix obtained from the first and second exposure times, and estimate that the eigenvector is the first and second cyclic noise components of the first and second images.

14. The image processing apparatus according to claim 13, wherein cyclic noise components of an image different from an image for which cyclic noise components have been calculated are calculated from a linear sum of the estimated noise components.

15. The image processing apparatus according to claim 7, wherein the processing circuitry is further configured to obtain the cyclic noise components for each image by obtaining $g_1, g_2$ which satisfy the following formula through least-squares estimation, $$\begin{bmatrix} t & -I \\ I & -r \end{bmatrix} \begin{bmatrix} g_1 \\ g_2 \end{bmatrix} = 0$$

where r is the ratio, t is the value obtained from the exposure times, I is a pixel value of the respective image and g is the noise components.

16. The image processing apparatus according to claim 1, wherein the information describing the relationship between the first image and the second image describes a mutual relationship between the first and second cyclic noise components.

17. An image processing method comprising:
capturing, using an image sensor, a first image having a first exposure time and a second image having a second exposure time, wherein the first exposure time is shorter than the second exposure time;
estimating, using processing circuitry, first cyclic noise components included in the first image based, at least in part, on information describing a relationship between the first image and the second image;
estimating, using the processing circuitry, second cyclic noise components included in the second image based, at least in part, on the information describing the relationship between the first image and the second image; and
generating, using the processing circuitry, a high dynamic range image based on the first image, the second image, the first cyclic noise components, and the second cyclic noise components.

18. A non-transitory computer readable medium storing a program that, when executed, causes a computer to execute processing comprising:
capturing, using an image sensor, a first image having a first exposure time and a second image having a second exposure time, wherein the first exposure time is shorter than the second exposure time;
estimating, using processing circuitry, first cyclic noise components included in the first image based, at least in part, on information describing a relationship between the first image and the second image;
estimating, using the processing circuitry, second cyclic noise components included in the second image based, at least in part, on the information describing the relationship between the first image and the second image; and
generating, using the processing circuitry, a high dynamic range image based on the first image, the second image, the first cyclic noise components, and the second cyclic noise components.

19. Electronic equipment comprising:
an image sensor configured to capture a first image having a first exposure time and a second image having a second exposure time, wherein the first exposure time is shorter than the second exposure time; and
processing circuitry configured to:
perform signal processing on pixel signals outputted from the image sensor, wherein the signal processing comprises:
estimating first cyclic noise components included in the first image based, at least in part, on information describing a relationship between the first image and the second image; and
estimating second cyclic noise components included in the second image based, at least in part, on the information describing the relationship between the first image and the second image;
performing correction to remove noise from the first and second images using the respective first and second noise components.

* * * * *